(12) United States Patent
Kitte et al.

(10) Patent No.: US 7,836,996 B2
(45) Date of Patent: Nov. 23, 2010

(54) PEDESTRIAN PROTECTION SYSTEM

(75) Inventors: Hajime Kitte, Aichi-ken (JP); Shigeyuki Suzuki, Aichi-ken (JP); Masashi Aoki, Aichi-ken (JP); Hitoshi Ida, Aichi-ken (JP); Hirokazu Matsuura, Aichi-ken (JP); Ichizo Shiga, Aichi-ken (JP); Michio Inoue, Aichi-ken (JP); Takaki Fukuyama, Aichi-ken (JP); Takeki Hayashi, Aichi-ken (JP); Tsukasa Sugiyama, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 81 days.

(21) Appl. No.: 12/382,768

(22) Filed: Mar. 24, 2009

(65) Prior Publication Data

US 2009/0242308 A1 Oct. 1, 2009

(30) Foreign Application Priority Data

Mar. 27, 2008 (JP) ............................. 2008-084326

(51) Int. Cl.
*B60R 21/34* (2006.01)
(52) U.S. Cl. .................. 180/271; 180/274; 296/187.04
(58) Field of Classification Search ................ 180/271, 180/274; 296/187.04, 187.09
See application file for complete search history.

(56) References Cited

U.S. PATENT DOCUMENTS

| | | | |
|---|---|---|---|
| 6,561,301 B1 * | 5/2003 | Hattori et al. ................ | 180/274 |
| 6,802,556 B2 * | 10/2004 | Mattsson et al. ....... | 296/187.09 |
| 6,920,954 B2 * | 7/2005 | Hashimoto et al. .......... | 180/274 |
| 7,024,293 B2 * | 4/2006 | Ishizaki et al. ................ | 701/45 |
| 7,073,619 B2 * | 7/2006 | Alexander et al. .......... | 180/274 |
| 7,143,856 B2 * | 12/2006 | Takahashi et al. ........... | 180/274 |
| 7,260,461 B2 * | 8/2007 | Rao et al. ...................... | 701/45 |
| 7,410,027 B2 * | 8/2008 | Howard ...................... | 180/274 |
| 7,543,677 B2 * | 6/2009 | Igawa .......................... | 180/274 |
| 7,669,685 B2 * | 3/2010 | Takahashi et al. ........... | 180/271 |
| 2004/0074688 A1 * | 4/2004 | Hashimoto et al. .......... | 180/271 |
| 2004/0169362 A1 * | 9/2004 | Hammer et al. ............. | 280/751 |
| 2007/0228706 A1 | 10/2007 | Nagae et al. | |

FOREIGN PATENT DOCUMENTS

EP 1024063 8/2000

(Continued)

*Primary Examiner*—Paul N Dickson
*Assistant Examiner*—Timothy D Wilhelm
(74) *Attorney, Agent, or Firm*—Posz Law Group, PLC

(57) ABSTRACT

A pedestrian protection system is mounted in the front portion of a vehicle, and includes a controller, a forward movement holding mechanism controlled in actuation by the controller, and a contact body that a pedestrian can contact. The controller, when having predicted a collision of a pedestrian with the vehicle based on a signal from a collision predicting sensor, actuates the forward movement holding mechanism to cause a forward movement of the contact body, and based on a signal from a turn sensor when the forward movement holding mechanism carries out an upward rotation or a downward rotation at the time of contact of the forwardly moved contact body with a pedestrian, controls actuation of the restraint body so as to correspond to a pedestrian moving to a front upper side of the vehicle and a pedestrian moving to a front lower side of the vehicle, respectively.

9 Claims, 21 Drawing Sheets

FOREIGN PATENT DOCUMENTS

| | | |
|---|---|---|
| EP | 1500562 | 1/2005 |
| JP | A-2000-219094 | 8/2000 |
| JP | A-2001-315599 | 11/2001 |
| JP | A-2001-322518 | 11/2001 |
| JP | A-2003-081052 | 3/2003 |
| JP | A-2003-341451 | 12/2003 |
| JP | UM-B-3100296 | 12/2003 |
| JP | A-2005-041391 | 2/2005 |
| JP | A-2006-036120 | 2/2006 |
| JP | A-2007-276503 | 10/2007 |

\* cited by examiner

PEDESTRIAN PROTECTION SYSTEM

BACKGROUND OF THE INVENTION

1. Field of the Invention

The present invention relates to a pedestrian protection system mounted in the front portion of a vehicle and structured to be disposed with a restraint body that is actuated at the time of collision of a pedestrian with the vehicle for protectably receiving in a manner corresponding to the pedestrian moving to a front upper side of the vehicle and the pedestrian moving to a front lower side of the vehicle, respectively, so as to be in a receiving state.

2. Related Art

Conventionally, as pedestrian protection systems, there have been ones using, for restraint bodies to receive pedestrians, airbags that are inflated by making inflating gases flow in or ones that are plastically deformed to absorb kinetic energy of pedestrians. Among the pedestrian protection systems using airbags, there has been one that allows disposing an inflated airbag at the front upper face of a vehicle (see JP 2000-219094A, for example), and one that allows disposing, at the front face of a vehicle, a large airbag that can receive an adult from the road surface in the vicinity of his/her chest (see JP 2003-341451A, for example). Moreover, among the pedestrian protection systems using restraint bodies that are plastically deformed, there has been one that stands a front edge part of a hood on the front upper face of a vehicle (see JP 2006-36120A, for example), and one that stands the restraint body so as to extend upward from a bumper located at the front portion side of a vehicle (see JP 2007-276503A, for example).

However, for example, in the case where the pedestrian is a small child, he/she may intrude into a space between the vehicle and the road surface at the time of collision, and because the conventional pedestrian protection systems of JP 2000-219094A, JP 2006-36120A, and JP 2007-276503A do not include parts to block the space with the road surface, there has been a problem with this point. On the other hand, in the pedestrian protection system of JP 2003-341451A, the airbag includes an area to block the space with the road surface but is extended high at the upper portion side so as to be able to protect an adult up to the vicinity of his/her chest, and thus the airbag is increased in volume, it takes time to complete inflation, and an inflator etc., for supplying the airbag with an inflating gas is increased in size, so that there has been a problem with the point of weight reduction.

To cope with these problems, it can be considered to use a sensor for detecting the build of a pedestrian and to arrange, when the pedestrian is tall, in consideration of his/her running onto the upper face of a vehicle at the time of collision with the vehicle, a restraint body such as an airbag at the upper face in the front portion of the vehicle, and when the pedestrian is a small child, in consideration of the likelihood of his/her intruding into the space on the lower face of a vehicle with the road surface at the time of collision with the vehicle, a restraint body such as an airbag at the lower face in the front portion of the vehicle.

However, with such a construction, it is difficult to cope with a mode of collision in the case where a pedestrian intrudes into the front lower side of a vehicle despite the pedestrian being tall or a pedestrian moves to the front upper side of a vehicle despite the pedestrian being small, conversely.

SUMMARY OF THE INVENTION

The present invention is made to solve the above-described problems, and aims to provide, with a simple construction, a pedestrian protection system capable of properly protecting a pedestrian in response to the mode of collision of the pedestrian moving to the front upper side or the front lower side of a vehicle.

A pedestrian protection system according to the present invention is a pedestrian protection system mounted in a front portion of a vehicle and structured to allow disposing a restraint body that is actuated at the time of collision of a pedestrian with the vehicle for protectably receiving in a manner corresponding to the pedestrian moving to a front upper side of the vehicle and the pedestrian moving to a front lower side of the vehicle, respectively, so as to be in a receiving state, comprising:

a contact body that is projected forward from an initial position where the contact body is stored in a front face of the vehicle, for contacting the pedestrian, at the time of actuation;

a forward movement holding mechanism that makes the contact body projectable forward at the time of actuation, for holding the contact body from a rear side thereof;

a turn holding mechanism for holding a rear portion of the forward movement holding mechanism so as to rotate the forward movement holding mechanism to one side of upward or downward, at the time of contact of the forwardly moved contact body with the pedestrian, in response to a magnitude of pressing force toward an upper portion or toward a lower portion of the contact body;

a collision predicting sensor disposed on the vehicle, for predicting the collision of the pedestrian with the vehicle;

a turn sensor for detecting an upward or downward turn of the forward movement holding mechanism; and a controller for controlling actuation of the forward movement holding mechanism and the restraint body based on signals from the collision predicting sensor and the turn sensor, wherein when having predicted the collision of the pedestrian with the vehicle based on a signal from the collision predicting sensor, the controller actuates the forward movement holding mechanism to cause a forward movement of the contact body, and based on a signal from the turn sensor when the forward movement holding mechanism carries out an upward rotation or a downward rotation at the time of contact of the forwardly moved contact body with the pedestrian, the controller controls actuation of the restraint body so as to correspond to the pedestrian moving to a front upper side of the vehicle and the pedestrian moving to a front lower side of the vehicle.

In the pedestrian protection system according to the present invention, when having predicted the collision of the vehicle with the pedestrian based on a signal from the collision predicting sensor, the controller actuates the forward movement holding mechanism to cause a forward movement of the contact body from the initial position to the forward position where the contact body can contact the pedestrian. Then, the pedestrian hits against the contact body, and in response to the magnitude of pressing force toward an upper portion or toward a lower portion of the contact body, the forward movement holding mechanism rotates to one side of upward or downward.

Then, if the forward movement holding mechanism carries out an upward rotation or a downward rotation, the controller, based on a signal from the turn sensor, actuates the restraint body, so that the restraint body protectably receives the pedestrian moving to a front upper side or a front lower side of the vehicle.

More specifically, in the pedestrian protection system according to the present invention, it can be judged from an upward rotation or a downward rotation of the mechanically operating forward movement holding mechanism whether the pedestrian will move to the front upper side of the vehicle or the pedestrian will move to the front lower side of the vehicle, and the restraint body can be properly disposed to be in a receiving state of the pedestrian according to an actual mode of collision of the pedestrian with the vehicle.

Accordingly, the pedestrian protection system according to the present invention can, with a simple construction, properly protect the pedestrian in response to the mode of collision of the pedestrian moving to the front upper side or the front lower side of a vehicle.

Moreover, in the pedestrian protection system according to the present invention, because the restraint body is actuated so as to be able to selectively protect the pedestrian moving to the front upper side of the vehicle or the pedestrian moving to the front lower side of the vehicle, the restraint body can be formed small, so that it becomes possible to construct the pedestrian protection system with remarkably lightweight and small size.

Moreover, in the pedestrian protection system according to the present invention, it is desirable that the forward movement holding mechanism includes:

a connection supporting member that extends rearward in a manner connected to a rear face of the contact body; and a drive source that holds the connection supporting member, and is actuated by an actuation signal from the controller to cause a forward movement of the connection supporting member along with the contact body, and the turn holding mechanism includes:

a holding shaft disposed, at a rear side of the forward movement holding mechanism, with its axial direction lying along a left and right direction, and being rotatable around the axis; and a connection holding member for connecting the drive source of the forward movement holding mechanism to the holding shaft, and disposed at, at least, a part of the forward movement holding mechanism and the turn holding mechanism is a deforming portion that is deformed so as to be able to absorb kinetic energy of the pedestrian when the forward movement holding mechanism turns upward and downward at the time of contact of the forwardly moved contact body with the pedestrian.

In such a construction, the deforming portion disposed at, at least, a part of the forward movement holding mechanism and the turn holding mechanism is plastically deformed or elastically deformed at the time of an upward rotation or a downward rotation of the forward movement holding mechanism in a state where the pedestrian is received by the contact body, so that kinetic energy of the pedestrian can be reduced, and this allows softening the subsequent interference of the pedestrian with the restraint body and restraining reaction of the restraint body to be exerted to the pedestrian.

Moreover, in the pedestrian protection system according to the present invention, if the controller is structured so as to actuate the forward movement holding mechanism so as to return the contact body to an initial position, after actuating the forward movement holding mechanism to cause a forward movement of the contact body, when the collision of the pedestrian with the vehicle is avoided, the components etc., can be reused without replacement next time when the collision with the pedestrian is predicted. Also, with regard to avoidance of the collision of the pedestrian with the vehicle, it is judged that the collision has been avoided if the controller is not input with a signal from the turn sensor that detects an upward or downward turn of the forward movement holding mechanism even after a certain time period has elapsed since it was input with a collision prediction signal from the collision predicting sensor. Alternatively, it may be possible to mount, on the vehicle, a collision detection sensor for detecting an actual collision of the vehicle with the pedestrian and that the controller judges that the collision has been avoided if it is not input with a signal from the collision detection sensor even after a certain time period has elapsed since it was input with a collision prediction signal from the collision predicting sensor.

Furthermore, in the pedestrian protection system according to the present invention, as the restraint body for receiving the pedestrian moving to a front upper side or a front lower side of the vehicle, an airbag that, at the time of actuation to be in a receiving state, makes an inflating gas flow in and projects from a storing part to inflate can be exemplified. In this case, the airbag serving as a restraint body can receive the pedestrian with excellent cushioning characteristics.

Moreover, the restraint body for receiving the pedestrian moving to a front upper side of the vehicle may be, as a hood panel, moved to rise at the time of actuation to be in a receiving state. In this case, the hood panel can be arranged, above an engine room, with an increased deformation space that allows deforming downward, so that the pedestrian plastically deforms the hood panel to be received by the hood panel while kinetic energy is absorbed.

Still moreover, in the pedestrian protection system according to the present invention, it may be possible to form the restraint body of one airbag that, at the time of actuation to be in a receiving state, makes an inflating gas flow in to inflate, structure the forward movement holding mechanism so as to hold the airbag and a case storing the airbag while having an opening from which the airbag is projectable and arranged at a rear face of the contact body, dispose an interlock mechanism that faces the opening from which the airbag is projected in the case upward or downward in an interlocked manner with an upward rotation or a downward rotation of the forward movement holding mechanism, and dispose the one airbag so as to inflate, according to a direction of the opening of the case by the interlock mechanism, at the time of actuation, in a manner corresponding to the pedestrian moving to a front upper side or a front lower side of the vehicle.

In such a construction, when the forward movement holding mechanism carries out an upward rotation or a downward rotation, the interlock mechanism can make the opening from which the airbag is projected in the case face upward or downward so that the airbag can be projected from the predetermined opening to inflate at the front upper side or the front lower side of the vehicle, and the construction can be provided using one airbag, and thus it also suffices to provide one case for storing the airbag and one gas supply mechanism for supplying the airbag with an inflating gas, and the pedestrian protection system can be more simply constructed.

In this case, it may be possible to dispose the case, at an upper face and a lower face, with openings from which the airbag is projectable and covers that openably cover the respective openings, respectively, construct the interlock mechanism with connecting members that are connected, for the covers at the upper face and the lower face of the case, respectably, so that an opening movement is possible, and dispose the respective connecting members with end portions of the respective connecting members departing from connecting parts with the covers being held, in the vicinity of a center of rotation of the forward movement holding mechanism, at mutually vertically inverted positions so that an opening movement of the corresponding cover is possible when the forward movement holding mechanism carries out an upward rotation or a downward rotation.

With such a construction, when the forward movement holding mechanism holding the case carries out an upward rotation or a downward rotation, if the cover is about to rotate along with the forward movement holding mechanism and the case so that a longer length from the end portion is required at the connecting part to the cover during a rotary movement than the length L of the connecting member itself from the held end portion to the connecting part to the cover, by that increment in length, conversely, the connecting member reaches a state of drawing the cover, that is, causes an opening movement of the cover so as to form the opening. More specifically, with the construction as in the above, a mechanical operation of the interlock mechanism constructed with the connecting member, as a result of a turn of the forward movement holding mechanism, allows opening the opening for projection of the airbag in the case for storing one airbag at an upper side or a lower side by an opening movement of the cover due to drawing of the predetermined connecting member, and due to the subsequent inflow of an inflating gas, the airbag projects from the predetermined opening of the case, and the front upper side or the front lower side of the vehicle can be covered. Therefore, in the construction as in the above, the pedestrian protection system structured to cover the front upper side or the front lower side of the vehicle with one airbag stored in the case can be constructed with a further simple structure without separately providing a drive source for opening the opening for projection of the airbag in the case.

Likewise, it may be possible to provide the case, at a front end arranged at a rear side of the contact body, with a front-end opening from which the airbag is projectable, and make the case be held by the forward movement holding mechanism so as to be rotatable with the front-end opening facing upward or downward, construct the interlock mechanism with a supporting member for supporting a further rear-side part than a center of rotation with respect to the forward movement holding mechanism in the case, and the supporting member is disposed in order to form a gap where the airbag is projectable between the contact body and the front-end opening, so as to be able to relatively rotate the case with respect to the forward movement holding mechanism at the time of rotation, in order to positionally restrict a rear-side part of the case, so as to be able to move the case forward and rearward and so as to be unable to move the rear-side part of the case upward and downward.

Also in such a construction, when the forward movement holding mechanism holding the case carries out an upward rotation or a downward rotation, because the center of rotation of the case with respect to the forward movement holding mechanism is rotated along with the forward movement holding mechanism while the case is positionally restricted in the rear-side part of the case by the supporting member, the case itself, so as to form a gap where the airbag is projectable between the contact body and the front-end opening, relatively rotates the case with respect to the forward movement holding mechanism at the time of rotation to face the front-end opening further upward or downward. That is, with the construction as in the above, a mechanical operation of the interlock mechanism constructed with the supporting material, as a result of a turn of the forward movement holding mechanism, allows opening the front-end opening of the case for storing one airbag facing upward or downward with the gap provided between the same and the contact body by a relative rotation of the case due to positional restriction of the supporting member. And, due to the subsequent inflow of an inflating gas, the airbag projects from the front-end opening of the case, and the front upper side or the front lower side of the vehicle can be covered. Therefore, also in the construction as in the above, the pedestrian protection system structured to cover the front upper side or the front lower side of the vehicle with one airbag stored in the case can be constructed with a further simple structure without separately providing a drive source for opening the opening for projection of the airbag in the case.

Of course, without consideration of the above points, it may be possible to dispose, as the restraint body, two types of an upper restraint body to be disposed at the front upper side of a vehicle and a lower restraint body to be disposed at the front lower side of a vehicle, and that the controller, based on a signal from the turn sensor, actuates the upper restraint body or the lower restraint body, and when the forward movement holding mechanism carries out an upward rotation, actuates the upper restraint body so as to be in a receiving state of the pedestrian moving by the front upper side of a vehicle without actuating the lower restraint body, and when the forward movement holding mechanism carries out a downward rotation, actuates the lower restraint body so as to be in the receiving state of the pedestrian moving by the front lower side of a vehicle without actuating the upper restraint body.

DETAILED DESCRIPTION OF THE PREFERRED EMBODIMENTS

Figure 1:
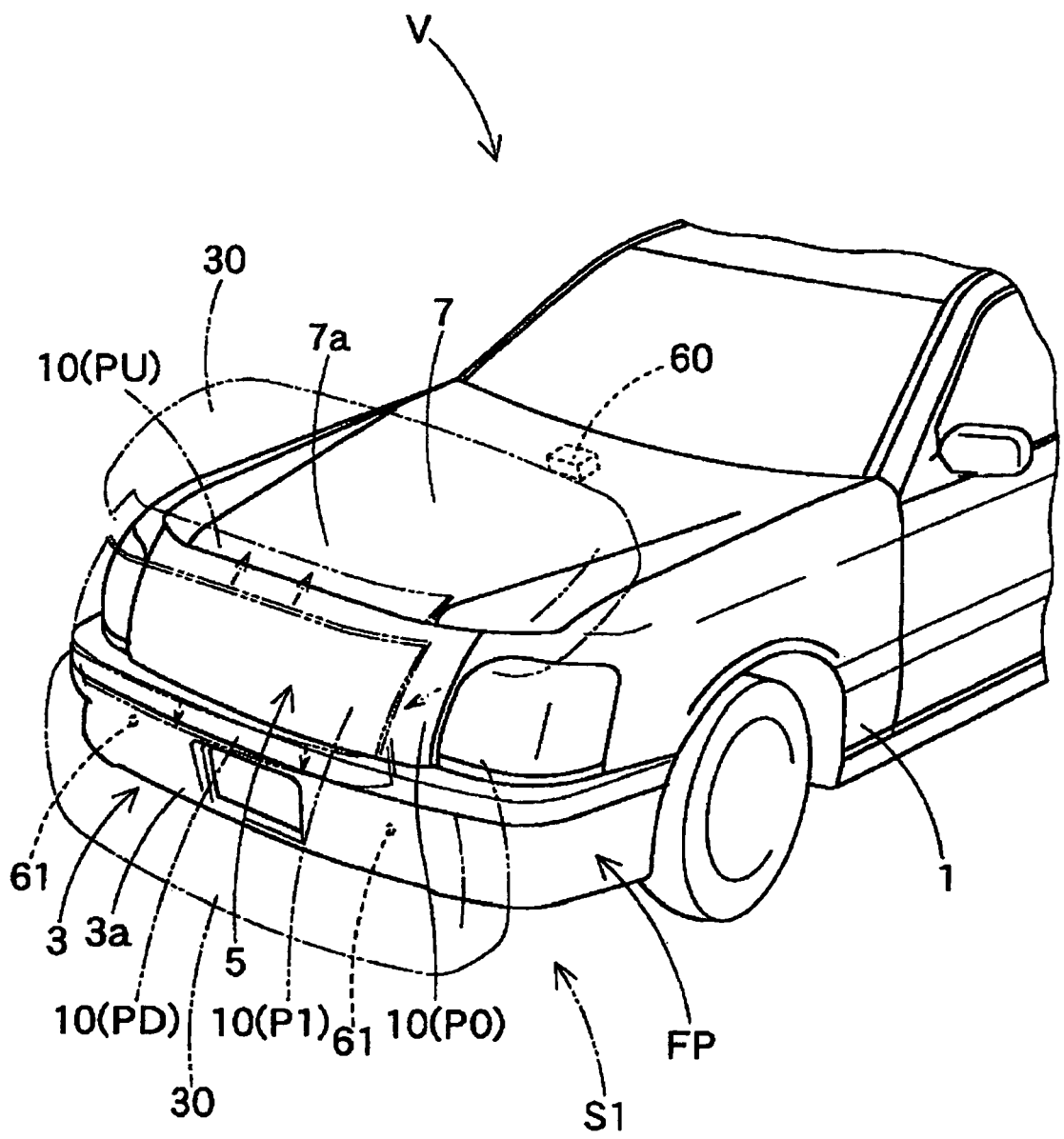
FIG. 1 is a perspective view of a vehicle mounted with a pedestrian protection system of the first embodiment of the present invention.
Figure 2:
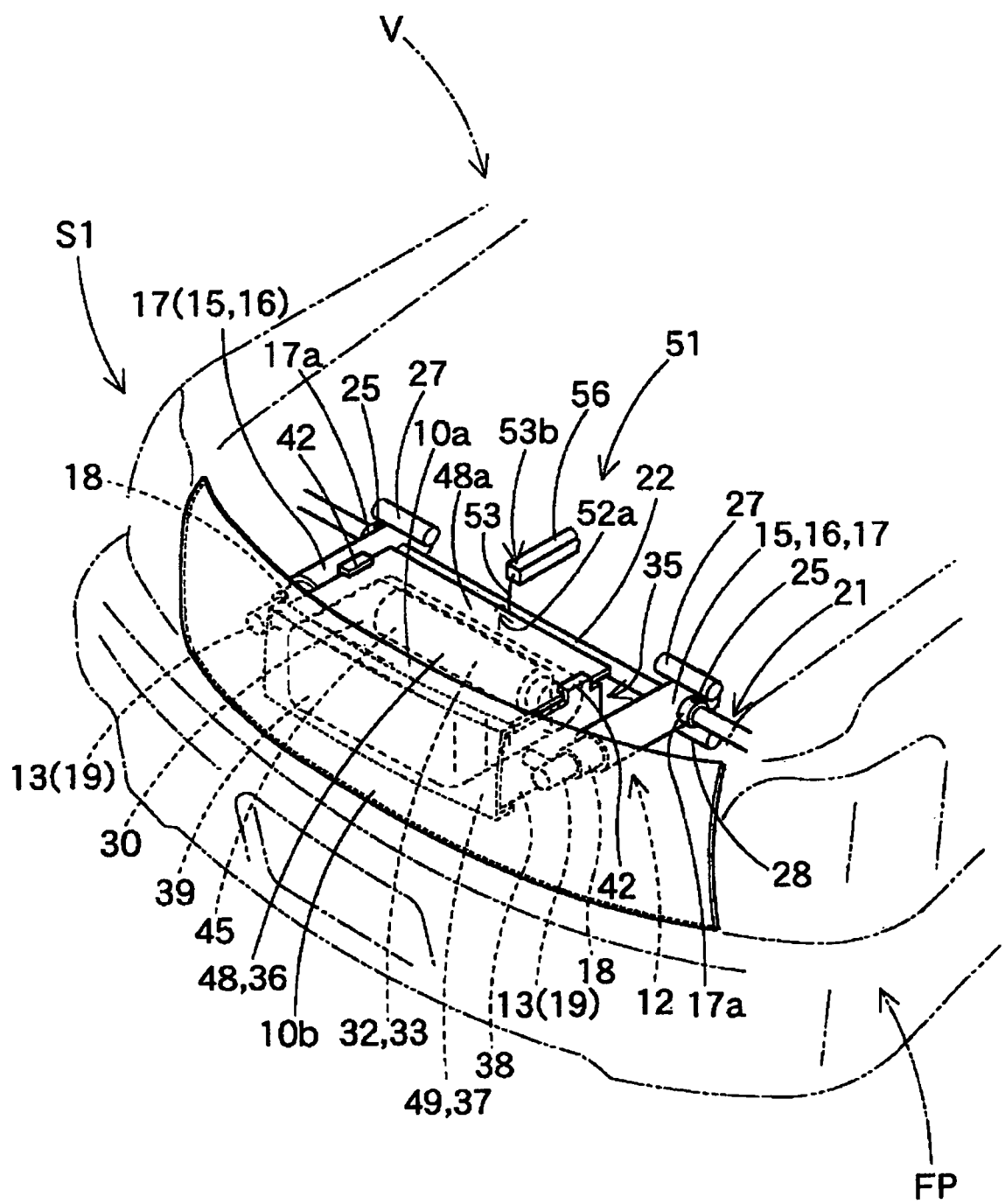
FIG. 2 is a schematic perspective view of the pedestrian protection system of the first embodiment observed from the front side.

Hereinafter, to explain a first embodiment of the present invention based on the drawings, a pedestrian protection system S1 of the first embodiment is, as shown in FIGS. 1 and 2, mounted on the part of a front grille (hereinafter, simply referred to as a grille) 5 in a front portion FP of a vehicle V. Also, in the present specification, the front and rear direction corresponds to a direction along the front and rear direction of the vehicle V, and the left and right direction corresponds to a left and right direction when the front side of a vehicle is observed from the rear side.

The pedestrian protection system S1 of the first embodiment is, as shown in FIGS. 1 and 2, constructed with a contact body 10, a forward movement holding mechanism 12, a turn holding mechanism 21, an airbag 30 serving as a restraint body, a gas supply mechanism 32 for supplying the airbag 30 with an inflating gas, a case 35 for storing the airbag 30, and a controller 60.

The contact body 10 is, as shown in FIGS. 2 to 5, in the form of a curved plate stored in a front face of the grille 5 of the vehicle V, projected forward from an initial position P0 where this is stored to a forward position P1, and contacts (abuts against) a pedestrian so as to receive the pedestrian. Then, further, the contact body 10 moves, according to the state of contact with the pedestrian, to a rising position PU (see FIG. 7B and FIG. 8) and a falling position PD (see FIG. 9B and FIG. 10) with an upward rotation and a downward rotation of the forward movement holding mechanism 12 (see FIG. 1).

The forward movement holding mechanism 12, at the time of actuation, makes the contact body 10 projectable forward, and holds the contact body 10 from the rear side, and is constructed with a connection supporting member 13 and a drive source 15. The connection supporting member 13 is disposed double so as to extend rearward in a manner connected to a rear face in the vicinity of both left and right edges of the contact body 10. The drive source 15 holds each connection supporting member 13, and is actuated by an actuation signal from the controller 60 to cause a forward movement of the connection supporting members 13 along with the contact body 10. In the case of the first embodiment, the drive source 15 is capable of a reversible operation, and structured so as to, with the use of working fluids of water, oil, air, etc., as a piston cylinder-type actuator 16 using a water pressure, an oil pressure, an air pressure, etc., of those, project double-tiered actuation rods 18 and 19 from a housing 17 at the time of actuation. Moreover, in the case of the first embodiment, the actuation rod 19 at the front end is used also as the connection supporting member 13.

The turn holding mechanism 21, as shown in FIGS. 2 to 5, holds a rear portion of the forward movement holding mechanism 12 so as to rotate the forward movement holding mechanism 12 to one side of upward or downward, at the time of contact of the forwardly moved contact body 10 with a pedestrian, in response to the magnitude of pressing force toward an upper portion 10a or toward a lower portion 10b of the contact body 10, and is constructed with a holding shaft 22, a connection holding member 25, and stoppers 27, 28. The holding shaft 22 is disposed, at a rear side of the forward movement holding mechanism 12, with its axial direction lying along the left and right direction, and made rotatable around the axis.

Figure 4:
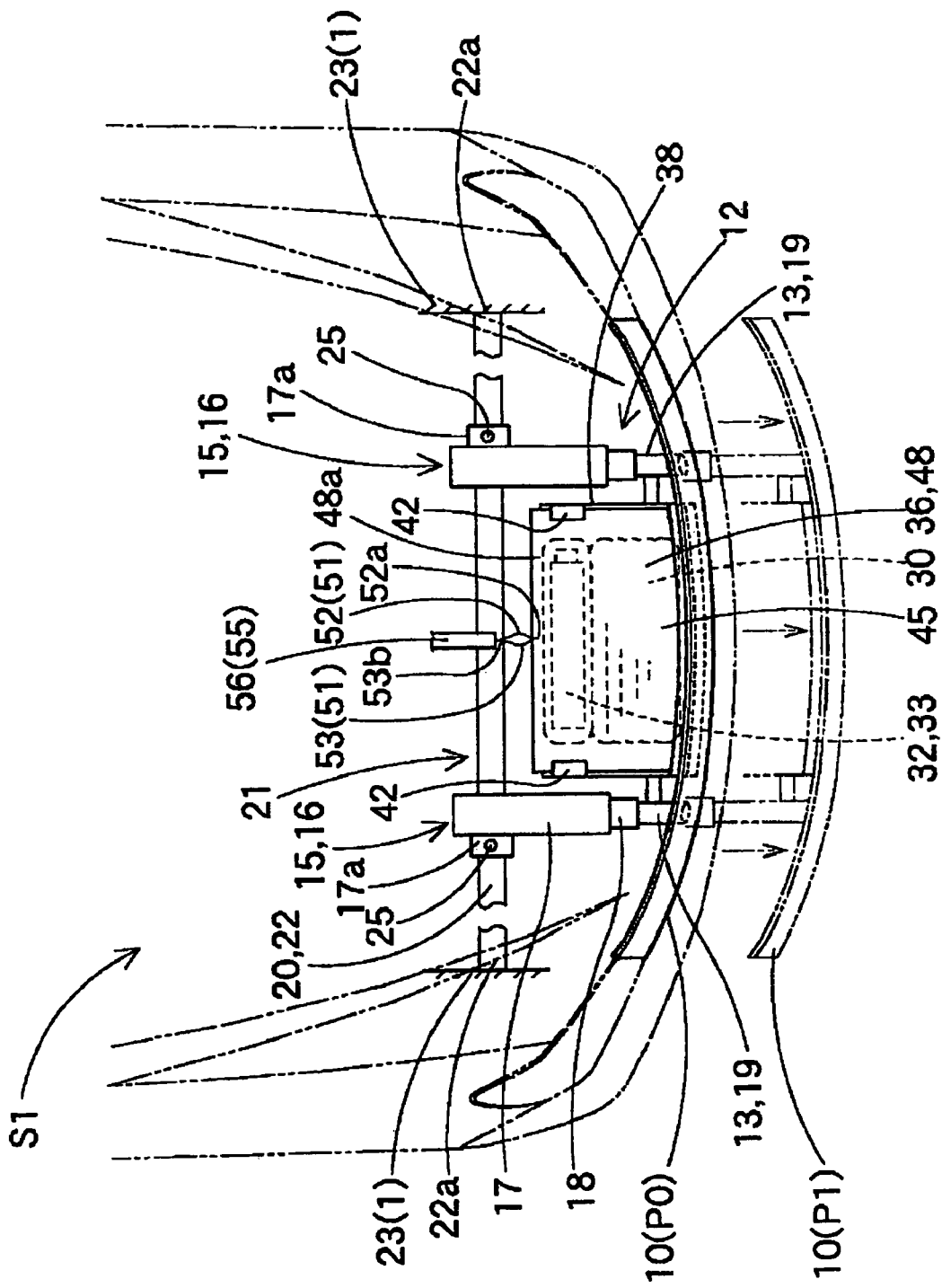
FIG. 4 is a schematic plan view of the pedestrian protection system of the first embodiment.
Figure 5:
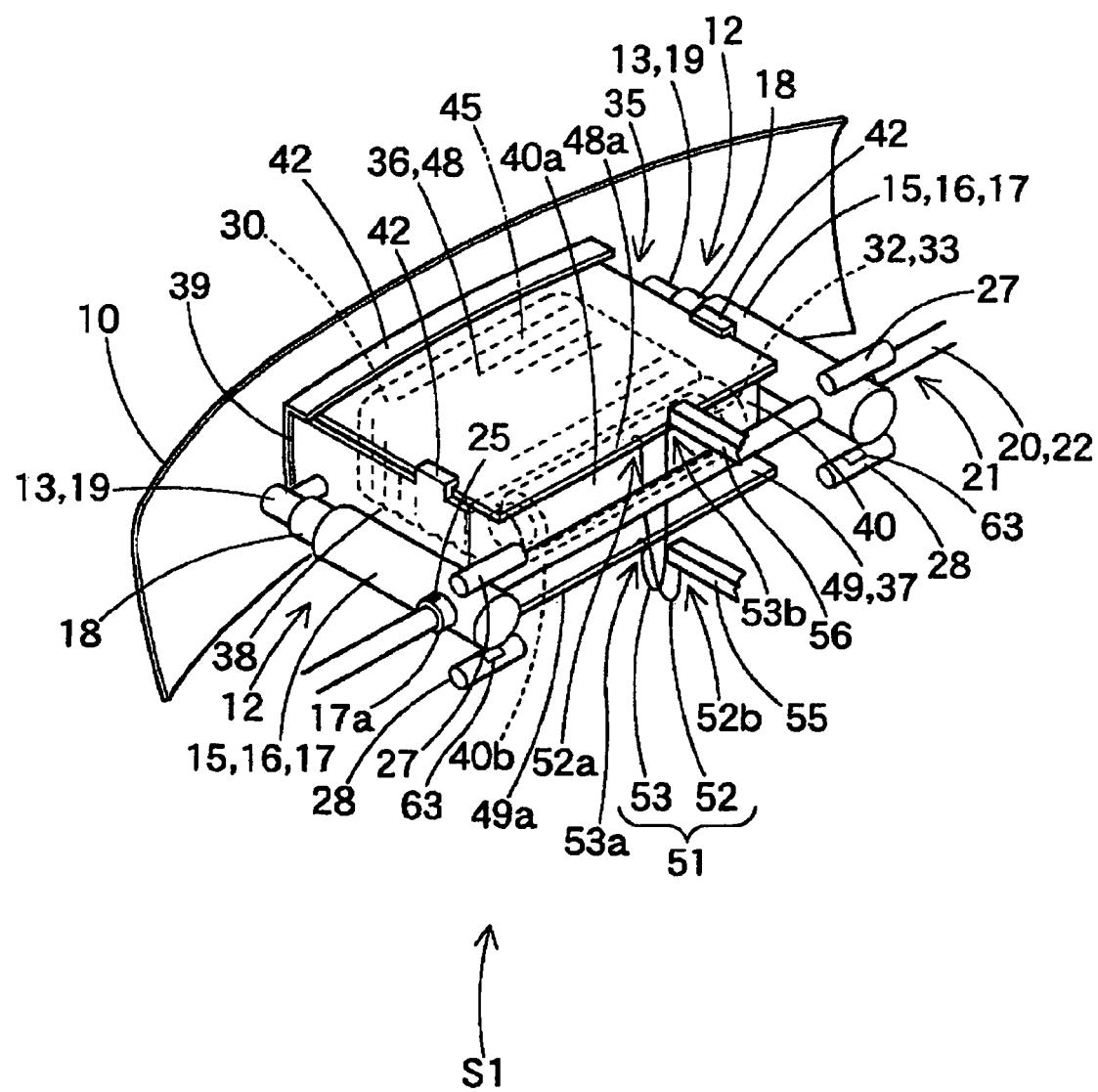
FIG. 5 is a schematic perspective view of the pedestrian protection system of the first embodiment observed from the rear side.

In the case of the first embodiment, the holding shaft 22 penetrates through the housing 17 of each actuator 16 of the forward movement holding mechanism 12 and fixes end portions 22a at both left and right sides to support plates 23 (see FIG. 4). The support plate 23 is connected and fixed to a structural material such as a side member in a body 1 of the vehicle. And, in the case of the first embodiment, the holding shaft 22 forms a deforming portion 20 that causes torsional plastic deformation at the time of an upward rotation or a downward rotation of the forward movement holding mechanism 12. More specifically, the holding shaft 22 is formed of a metal material such as steel, and when the forward movement holding mechanism 12 turns upward and downward at the time of contact of the forwardly moved contact body 10 with a pedestrian, absorbs kinetic energy of the pedestrian as a deforming portion 20 that causes torsional plastic deformation.

The connection holding member 25 is formed of a screw member for fixing, to the holding shaft 22, a circular cylindrical sleeve 17a provided on the housing 17 of each actuator 16 and inserted therethrough with the holding shaft 22. The connection holding member 25 may be screwed into the sleeve 17a so as to make its front end abut against the holding shaft 22 at the time of tightening, or may be penetrated through the sleeve 17a and screwed into the holding shaft 22 itself. In the case of a structure where the connection holding member 25 is penetrated through the sleeve 17a and screwed into the holding shaft 22 itself, the connection holding member 25 may be used as a shear pin that can form a deforming portion and be broken at the time of an upward rotation or a downward rotation of the forward movement holding mechanism 12 so as to rotate the sleeve 17a around the holding shaft 22 along with the housing 17 of the actuator 16.

In addition, so as to be able to restrict more than a predetermined degree of rotation of the forward movement holding mechanism 12 while abutting against the rear end side of the housing 17, the stoppers 27, 28 are disposed above and below a rear side of the holding shaft 22.

The case 35 for storing the airbag 30 is, as shown in FIGS. 2 to 6B, with openings 45, 46 (see FIGS. 6A, 6B, 8, and 10) from which the airbag 30 is projectable, arranged at the rear face of the contact body 10. The case 35 of the first embodiment, in an approximately rectangular parallelepiped box shape with an upper wall 36 and a lower wall 37 opposed at top and bottom, left and right side walls 38, 38, and a front wall 39 and a rear wall 40 opposed at front and rear, is disposed, at the parts of the upper wall 36 and the lower wall 37, with an upward facing opening 45 and a downward facing opening 46 for projection of the airbag 30. More specifically, in the case of the first embodiment, the upper wall 36 itself serves as a cover (upper cover) 48 to open the opening 45, the lower wall 37 itself serves as a cover (lower cover) 49 to open the opening 46, and the upper cover 48 and the lower cover 49 are connected to an interlock mechanism 51 so as to open the openings 45 and 46, respectively. The upper cover 48 and the lower cover 49 are, when closing the openings 45, 46, locked by locking claws 42, 43 extending from the side wall 38 and the front wall 39 so as not to separate up and down from the case 35, and as a result of rearward drawing, slidingly move to open the openings 45, 46.

The interlock mechanism 51, as shown in FIGS. 2 to 5, makes the openings 45, 46 from which the airbag 30 is projected in the case 35 open facing upward or downward in an interlocked manner with an upward rotation or a downward rotation of the forward movement holding mechanism 12. And, in the case of the first embodiment, the interlock mechanism 51 is constructed with two connecting members 52, 53. The connecting members 52, 53 are each formed of a string material such as a wire with flexibility, and connect, for the upper cover 48 and the lower cover 49 at the upper face and the lower face of the case 35, respectively, connecting parts 52a, 53a of the front end to rear edges 48a, 49a so that an opening movement is possible. Moreover, the respective connecting members 52, 53 are disposed with end portions 52b, 53b at the rear end side departing from the connecting parts 52a, 53b being held, in the vicinity of a center of rotation (center of the holding shaft 22) C0 of the forward movement holding mechanism 12, on fixing members 55, 56 arranged at mutually vertically inverted positions. Each fixing member 55, 56 is connected and fixed to the body 1. And, a length dimension L from the connecting part 52a, 53a to the end portion 52b, 53b of each connecting member 52, 53 is set so that the connecting member 52, 53 reaches a stretched state when the case 35 carries out a forward movement as a result of actuation of the actuator 16 of the forward movement holding mechanism 12 (see FIG. 7B). And, when the forward movement holding mechanism 12 carries out an upward rotation, the distance between the vicinity of an upper end 40a of the rear wall 40 on which the rear edge 48a of the upper cover 48 has been arranged and the fixing member 55 becomes longer than the length dimension L, and thus the connecting member 52 draws the upper cover 48 rearward to cause an opening movement (see FIG. 6A). Moreover, when the forward movement holding mechanism 12 carries out a downward rotation, the distance between the vicinity of a lower end 40b of the rear wall 40 on which the rear edge 49a of the lower cover 49 has been arranged and the fixing member 56 becomes longer than the length dimension L, and thus the connecting member 53 draws the lower cover 49 rearward to cause an opening movement (see FIG. 6B). Although the amount of drawing by the connecting members 52, 53 is not sufficient to open the entire area of the upper and lower openings 45, 46 of the case 35, if the airbag 30 inflates, due to an inflating force thereof, the upper cover 48 and the lower cover 49 are pushed rearward, so that the entire area of the openings 45, 46 is opened (see FIGS. 8 and 10).

Moreover, inside the case 35, as shown in FIGS. 2 and 4, the airbag 30 and an inflator 33 serving as the gas supply mechanism 32 are stored. The airbag 30 stores the inflator 33 inside. Moreover, the inflator 33 is attached to the rear wall 40 of the case 35 by penetrating a predetermined attaching bolt (not shown) through the airbag 30, and in that case, by tightening together, the airbag 30 is also attached to the rear wall 40 of the case 35.

Figure 3:
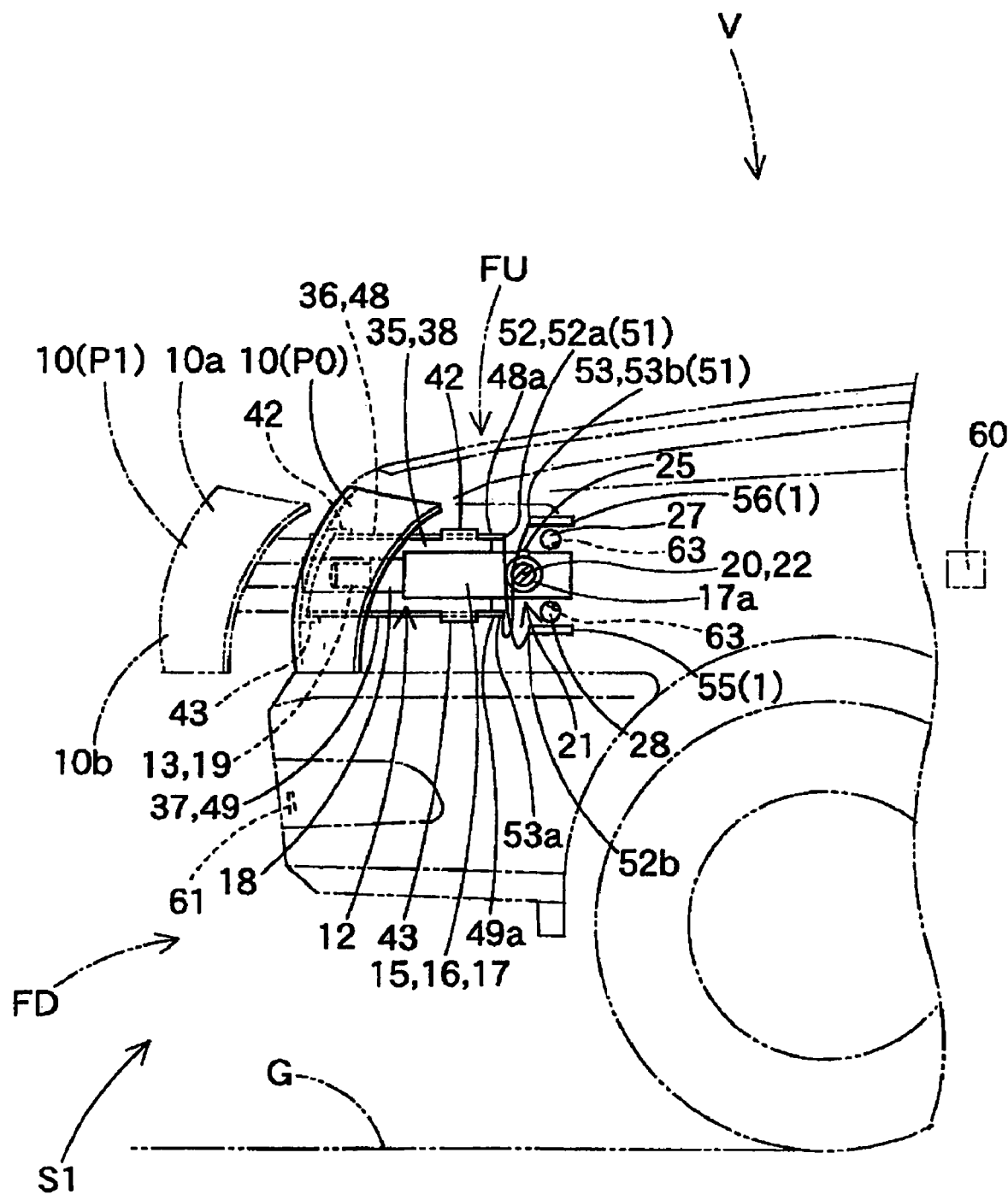
FIG. 3 is a schematic side view of the pedestrian protection system of the first embodiment.

The controller 60 controls actuation of the actuator 16 of the forward movement holding mechanism 12 and the inflator 33 based on signals from a collision predicting sensor 61 (see FIG. 1) and a turn sensor 63 (see FIG. 3). The collision predicting sensor 61 is constructed using ultrasonic waves, radar, or the like that enables predicting a collision of a pedestrian with the vehicle V, and disposed at a plurality of places of a bumper 3. The turn sensor 63, which detects an upward or downward turn of the forward movement holding mechanism 12, is formed of a microswitch or the like arranged at the part of the stopper 27, 28 and to be turned on at the time of contact with the housing 17 in the case of the first embodiment. Also, as the turn sensor 63, a sensor such as a contact sensor or an optical sensor that is arranged around the holding shaft 22 and capable of detecting a turn of the holding shaft 22 itself may be used.

And, the controller 60, when having predicted a collision of a pedestrian with the vehicle V based on a signal from the collision predicting sensor 61, actuates each actuator 16 of the forward movement holding mechanism 12 to cause a forward movement of the contact body 10, and then, based on a signal from the turn sensor 63 when the forward movement holding mechanism 12 carries out an upward rotation or a downward rotation at the time of contact of the forwardly moved contact body 10 with a pedestrian, actuates the inflator 33 so as to inflate the airbag 30 serving as a restraint body. Then, the controller 60, if there is no rotation signal of the forward movement holding mechanism 12 from the turn sensor 63 even after a certain time period has elapsed since actuation of each actuator 16, actuates the actuator 16 so as to make the contact body 10 return to the initial position P0, judging that the collision of the pedestrian with the vehicle V has been avoided.

More specifically, to explain actuation of the pedestrian protection system S1 of the first embodiment, when the vehicle V is about to collide with a pedestrian, because the controller 60 predicts the collision of the vehicle V with the pedestrian based on a signal from the collision predicting sensor 61, the controller 60, first, as shown by alternate long and two short dashed lines in FIGS. 3 and 4, actuates each actuator 16 of the forward movement holding mechanism 12 to cause a forward movement of the contact body 10 from the initial position P0 to the forward position P1 where the contact body 10 can contact the pedestrian. Then, the pedestrian hits against the contact body 10, and in response to the magnitude of pressing force toward the upper portion 10a or toward the lower portion 10b of the contact body 10, as shown in FIGS. 7A and 7B and FIGS. 9A and 9B, the forward movement holding mechanism 12 rotates to one side of upward or downward.

Figure 6A:
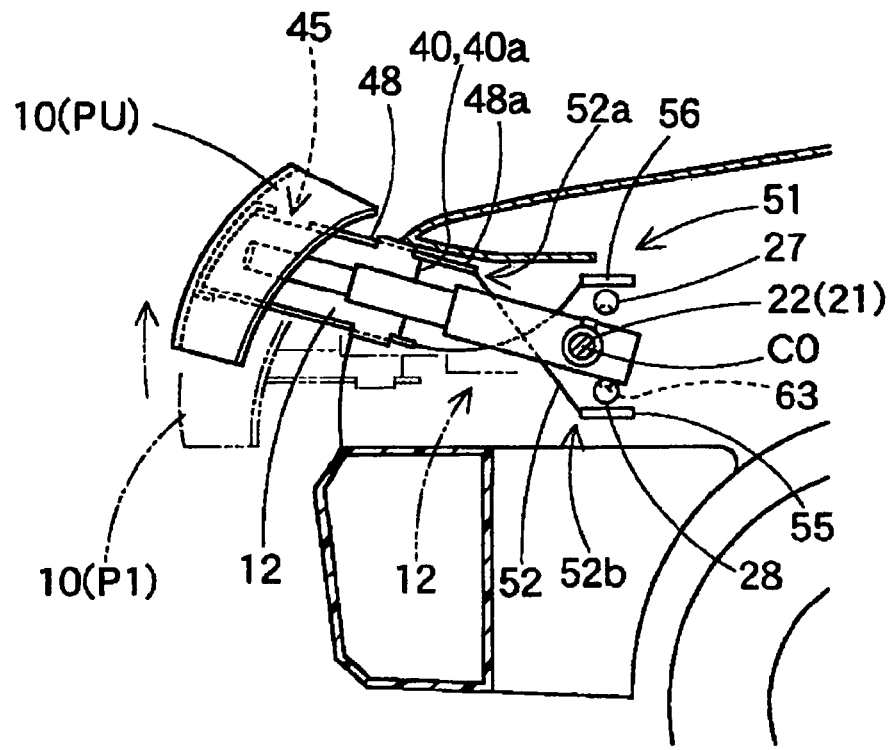
FIGS. 6A and 6B are views explaining states where an opening at an upper surface and an opening at a lower surface of a case of the pedestrian protection system of the first embodiment are opened, respectively.
Figure 6B:
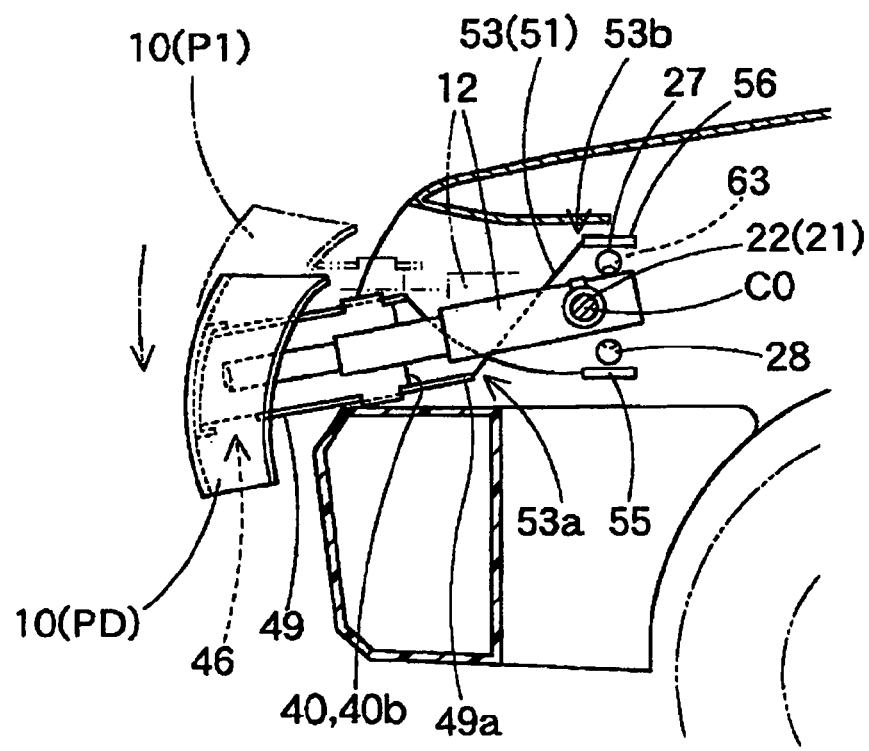

At this time, in the pedestrian protection system S1 of the first embodiment, as shown in FIGS. 6A and 6B, due to the interlock mechanism 51 connected to the case 35, when the forward movement holding mechanism 12 carries out an upward rotation, the distance between the vicinity of the upper end 40a of the rear wall 40 on which the rear edge 48a of the upper cover 48 has been arranged and the fixing member 55 becomes longer than the length dimension L, and thus the connecting member 52 draws the upper cover 48 rearward to cause an opening movement. Moreover, when the forward movement holding mechanism 12 carries out a downward rotation, the distance between the vicinity of the lower end 40b of the rear wall 40 on which the rear edge 49a of the lower cover 49 has been arranged and the fixing member 56 becomes longer than the length dimension L, and thus the connecting member 53 draws the lower cover 49 rearward to cause an opening movement.

Figure 8:
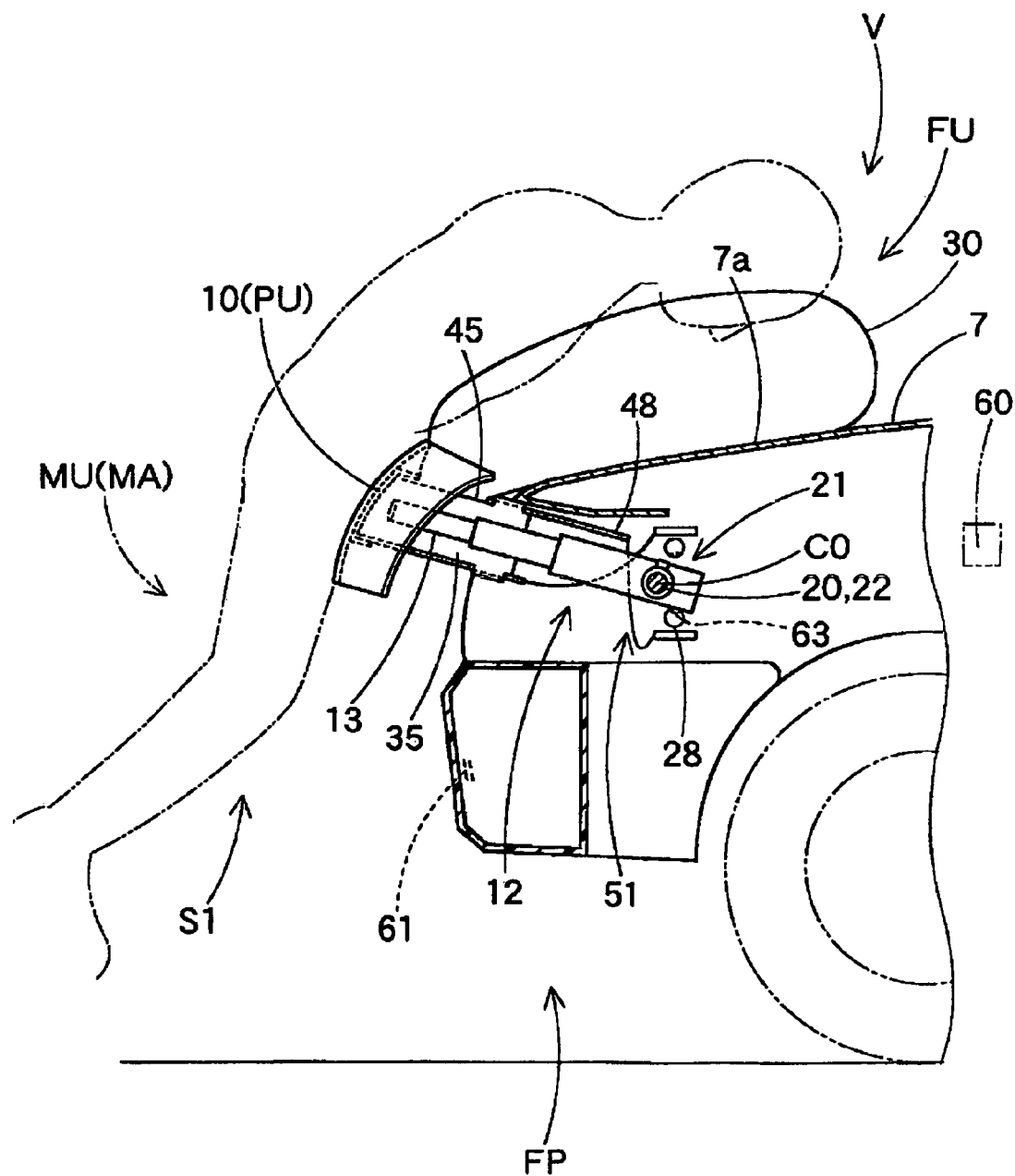
FIG. 8 is a view explaining a state where the airbag receives a pedestrian moving to a front upper side of the vehicle in the pedestrian protection system of the first embodiment.
Figure 10:
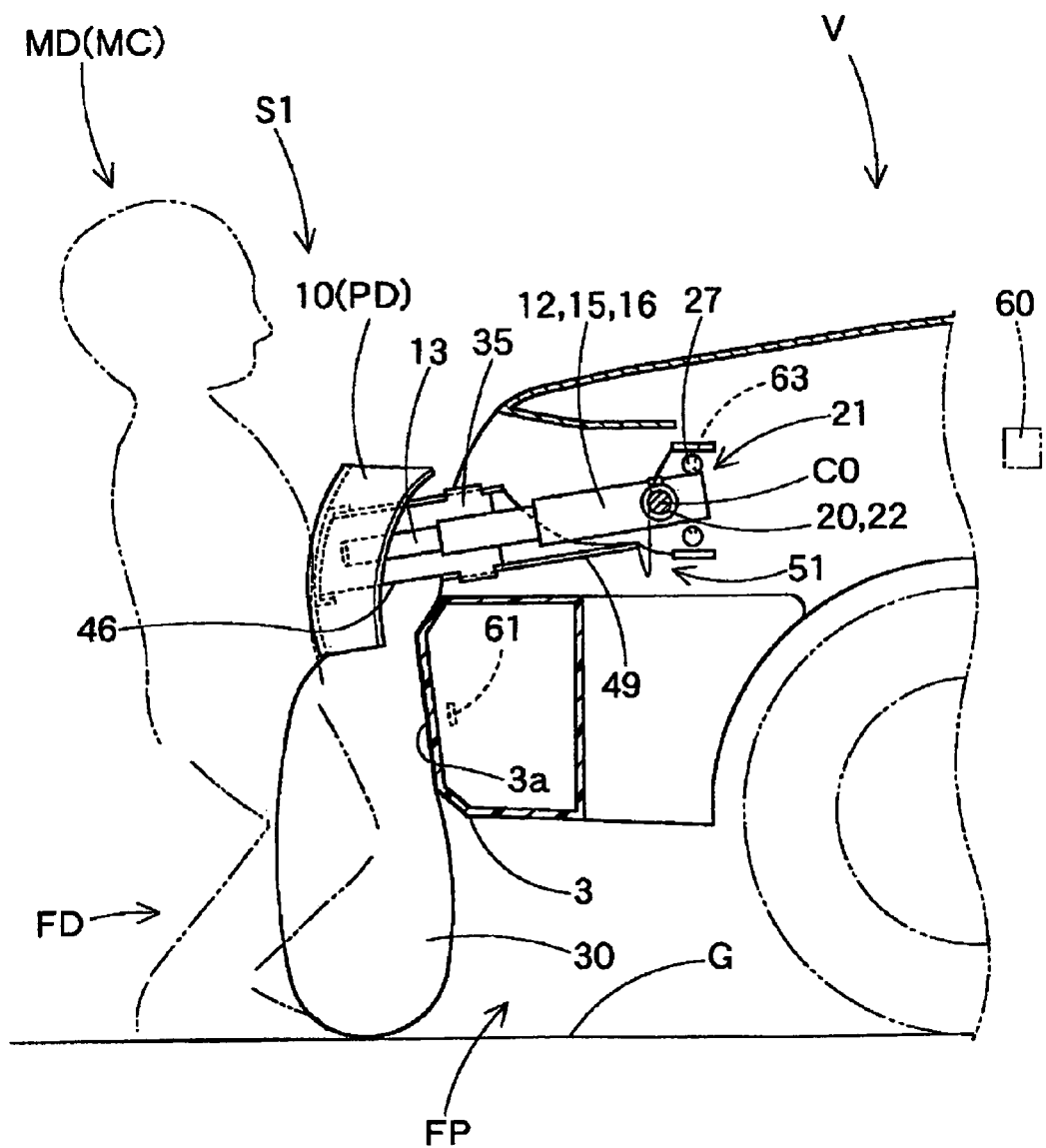
FIG. 10 is a view explaining a state where the airbag receives a pedestrian moving to a front lower side of the vehicle in the pedestrian protection system of the first embodiment.

Then, if the forward movement holding mechanism 12 carries out an upward rotation or a downward rotation, the controller 60, based on a signal from the turn sensor 63, actuates the inflator 33 so as to inflate the airbag 30. Therefore, if the airbag 30 inflates, due to an inflating force thereof, the upper cover 48 and the lower cover 49 are pushed rearward, so that the entire area of the openings 45, 46 is opened (see FIGS. 8 and 10). Then, when the opening 45 at the upper side of the case 35 is opened while the opening 46 at the lower side of the case 35 is closed, as shown in FIG. 8, the airbag 30 projects upward from the opening 45, and inflates at the upper face of a front portion 7a of a hood panel 7 to protectably receive a pedestrian MU moving to a front upper side FU of the vehicle V. Moreover, when the opening 46 at the lower side of the case 35 is opened while the opening 45 at the upper side of the case 35 is closed, as shown in FIG. 10, the airbag 30 projects downward from the opening 46, and inflates from the vicinity of a front face 3a of the bumper 3 to a road surface G to protectably receive a pedestrian MD moving to a front lower side FD of the vehicle V.

Figure 7A:
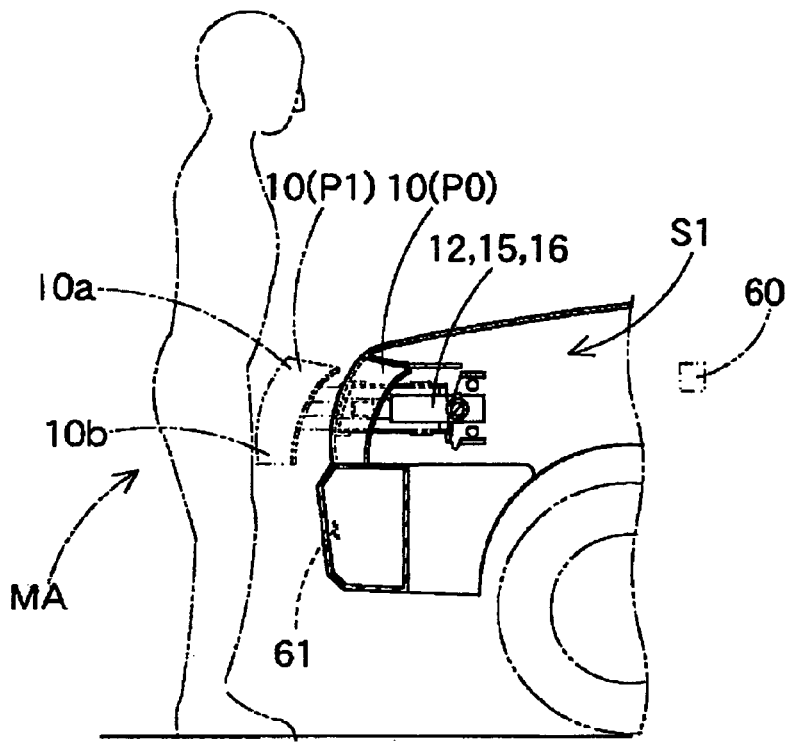
FIGS. 7A and 7B are views explaining an upward rotating state of the contact body and the advancement holding mechanism in the pedestrian protection system of the first embodiment.
Figure 7B:
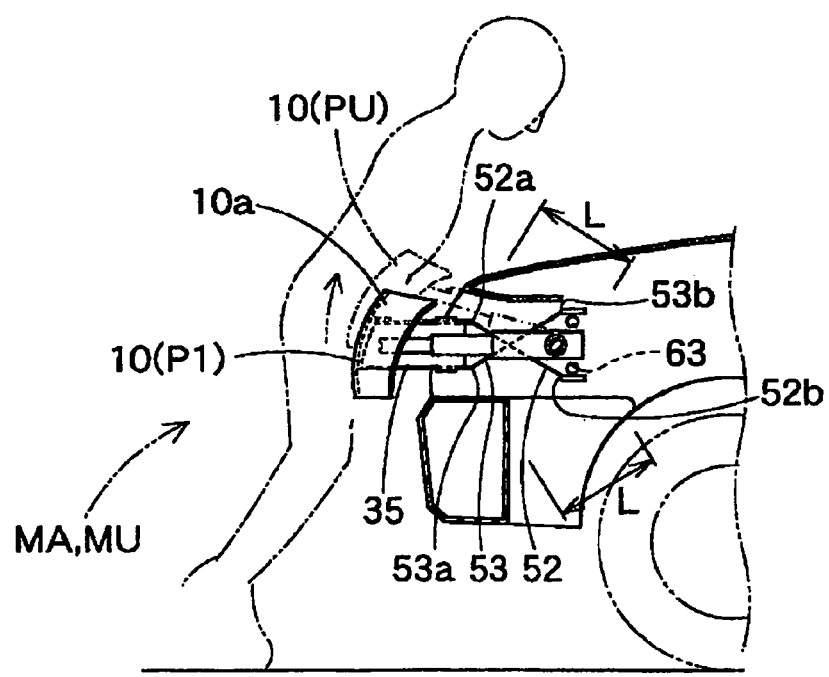
Figure 9A:
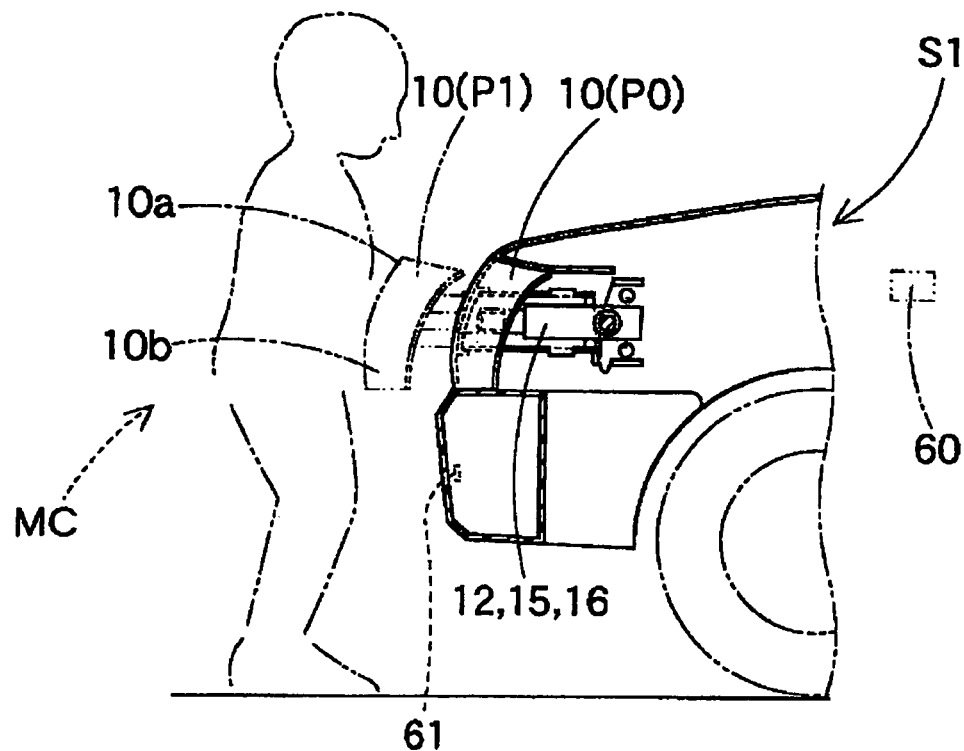
FIGS. 9A and 9B are views explaining a downward rotating state of the contact body and the advancement holding mechanism in the pedestrian protection system of the first embodiment.
Figure 9B:
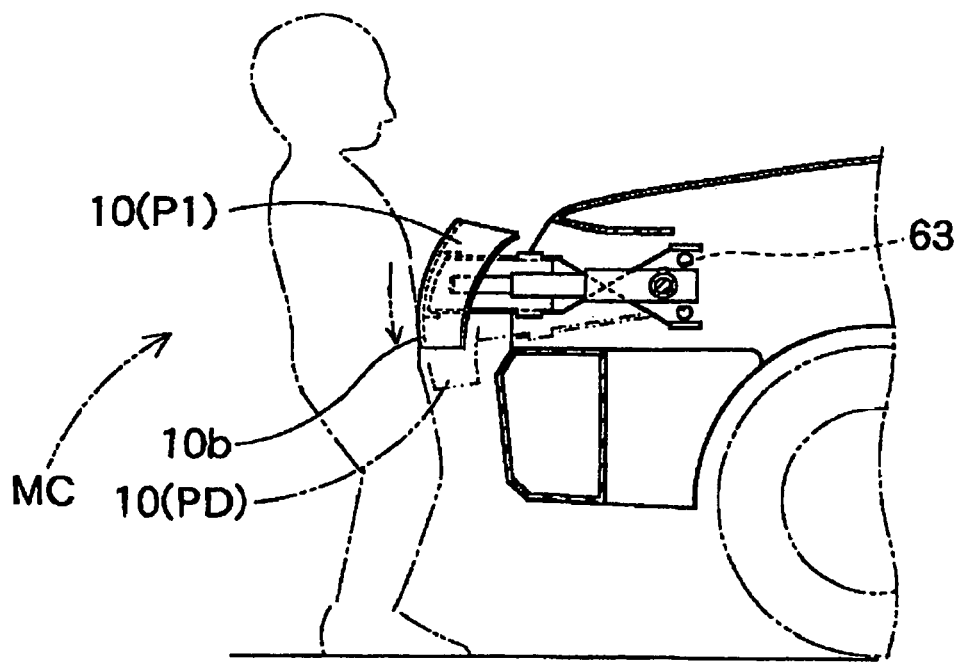
Figure 11A:
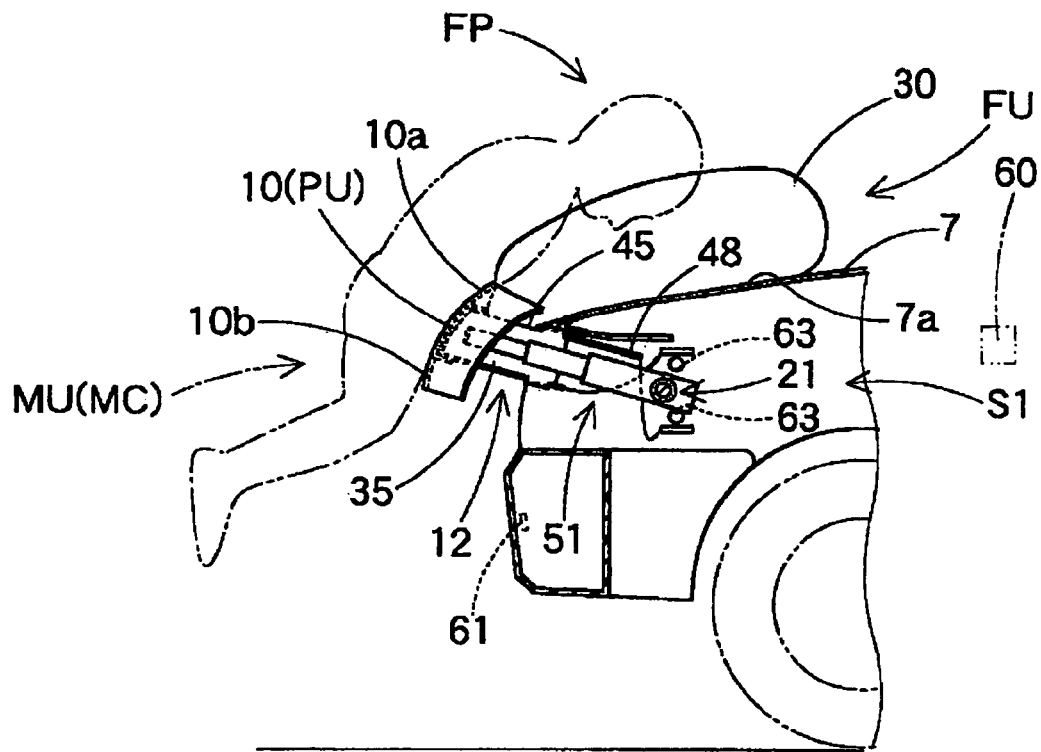
FIGS. 11A and 11B are views explaining the case of different modes of pedestrian protection in the pedestrian protection system of the first embodiment.
Figure 11B:
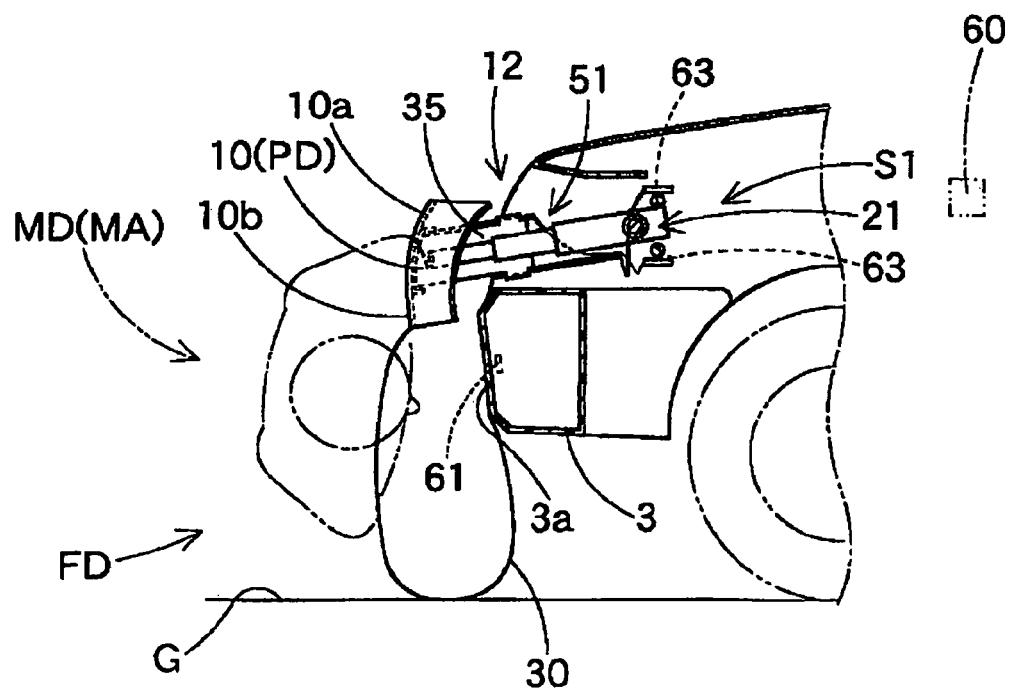

More specifically, in the pedestrian protection system S1 of the first embodiment, it can be judged from an upward rotation or a downward rotation of the mechanically operating forward movement holding mechanism 12 whether the pedestrian MU will move to the front upper side FU of the vehicle V or the pedestrian MD will move to the front lower side FD of the vehicle V, and the airbag 30 serving as a restraint body can be properly disposed while being inflated into a receiving state of the pedestrian MU, MD according to an actual mode of collision of the pedestrian MU, MD with the vehicle V. Additionally, in general, when a pedestrian MA is tall, as shown in FIGS. 7A, 7B and 8, he/she often runs onto the front upper side FU of a vehicle V at the time of collision with the vehicle V, and when a pedestrian MC is a small child, as shown in FIGS. 9A, 9B and 10, it is often the case that he/she is likely to intrude into the space on the front lower side FD of a vehicle V with a road surface G at the time of collision with the vehicle. However, in the case of the first embodiment, as shown in FIG. 11A, even when a pedestrian MD is tall and the pedestrian MA, MD intrudes into the front lower side FD of a vehicle V, or conversely, even when a pedestrian MC is small and the pedestrian MC, MU moves to the front upper side FU of a vehicle V, the airbag 30 serving as a restraint body can be properly disposed while being inflated into a receiving state of the pedestrian MU, MD in response to the mode of collision of those.

Accordingly, the pedestrian protection system S1 of the first embodiment can, with a simple construction, properly protect the pedestrian MU, MD in response to the mode of collision of the pedestrian MU, MD moving to the front upper side FU or the front lower side FD of a vehicle V.

And moreover, in the pedestrian protection system S1 of the first embodiment, because the holding shaft 22 serving as the deforming portion 20 suffers torsional plastic deformation when the forward movement holding mechanism 12 carries out an upward rotation or a downward rotation, kinetic energy of the pedestrian MU, MD can be reduced, and this allows softening the subsequent interference of the pedestrian MU, MD with the airbag 30 serving as a restraint body and restraining reaction of the airbag 30 to be exerted to the pedestrian MU, MD.

Also, in the pedestrian protection system S1 of the first embodiment, the forward movement holding mechanism 12 is constructed with the connection supporting members 13, 13 that extend rearward in a manner connected to the rear face of the contact body 10, and the drive source 15 that holds each connection supporting member 13, and is actuated by an actuation signal from the controller 60 to cause a forward movement of the connection supporting member 13 along with the contact body 10. Moreover, the turn holding mechanism 21 is constructed with the holding shaft 22 disposed, at the rear side of the forward movement holding mechanism 12, with its axial direction lying along the left and right direction, and being rotatable around the axis, the connection holding member 25 for connecting the drive source 15 of the forward movement holding mechanism 12 to the holding shaft 22, and the stoppers 27, 28 for restricting rotation of the forward movement holding mechanism 12. Therefore, using the connection holding member 25, the connection supporting member 13 and the actuation rod 19 of the drive source 15, or the stopper 27, 28 other than the holding shaft 22 as a deforming portion that causes plastic deformation or elastic deformation, the deforming portion may be plastically deformed or elastically deformed, at the time of an upward rotation or a downward rotation of the forward movement holding mechanism 12 in a state where the pedestrian MU, MD is received by the contact body 10, so as to reduce kinetic energy of the pedestrian MU, MD.

Also, in the pedestrian protection system S1 of the first embodiment, the drive source 15 of the forward movement holding mechanism 12 uses the actuator 16 capable of reversible actuation, and the controller 60, if it is not input with a signal from the turn sensor 63 even after a certain time period has elapsed since it actuated the actuator 16 of the forward movement holding mechanism 12 to cause a forward movement of the contact body 10, actuates the actuator 16 of the forward movement holding mechanism 12 so as to make the contact body 10 return to the initial position P0, judging that the collision of the pedestrian with the vehicle has been avoided. Therefore, the controller 60, after actuating the actuator 16 of the forward movement holding mechanism 12 to cause a forward movement of the contact body 10, if a collision of a pedestrian with the vehicle has been avoided, can make the contact body 10 return to an initial position P0, so that the components etc., can be reused without replacement next time when a collision with a pedestrian is predicted. Although, in the first embodiment, avoidance of a collision of a pedestrian with the vehicle is judged from the presence of a signal from the turn sensor 63, alternatively, it may be possible to mount, on the vehicle V, a collision detection sensor for detecting an actual collision of the vehicle V with a pedestrian and that the controller 60 judges that a collision has been avoided if it is not input with a signal from the collision detection sensor even after a certain time period has elapsed since it was input with a collision prediction signal from the collision predicting sensor 61.

Further, in the pedestrian protection system S1 of the first embodiment, the restraint body is formed of one airbag 30 that, at the time of actuation to be in a receiving state, makes an inflating gas flow in to inflate. Moreover, the forward movement holding mechanism 12 is structured so as to hold the airbag 30 and the case 35 storing the airbag 30 while having the opening 45, 46 from which the airbag 30 is projectable and arranged at the rear face of the contact body 10. And, in the pedestrian protection system S1, disposed is the interlock mechanism 51 that faces the opening 45, 46 from which the airbag 30 is projected in the case 35 upward or downward in an interlocked manner with an upward rotation or a downward rotation of the forward movement holding mechanism 12. Therefore, in the first embodiment, when the forward movement holding mechanism 12 carries out an upward rotation or a downward rotation, the interlock mechanism 51 can make the opening 45, 46 from which the airbag 30 is projected in the case 35 face upward or downward so that the airbag 30 can be projected from the predetermined opening 45, 46 to inflate at the front upper side FU or the front lower side FD of the vehicle V, and the construction can be provided using one airbag 30, and thus it also suffices to provide one case 35 for storing the airbag 30 and one inflator 33 of the gas supply mechanism 32 for supplying the airbag 30 with an inflating gas, and the pedestrian protection system S1 can be more simply constructed.

Particularly, in the first embodiment, disposed at an upper face and a lower face of the case 35 are openings 45, 46 from which the airbag 30 is projectable and an upper cover 48 and a lower cover 49 that cover the respective openings 45, 46 so that an opening movement is possible, respectively. And, the interlock mechanism 51 is constructed with connecting members 52, 53 that are connected, for the upper cover 48 and the lower cover 49 at the upper face and the lower face of the case 35, respectably, so that an opening movement is possible. These connecting members 52, 53 are disposed with end portions 52b, 53b of the respective connecting members 52, 53 departing from connecting parts 52a, 53a with the covers being held, in the vicinity of a center of rotation C0 of the forward movement holding mechanism 12, at mutually vertically inverted positions so that an opening movement of the corresponding upper cover 48 and lower cover 49 is possible when the forward movement holding mechanism 12 carries out an upward rotation or a downward rotation. Therefore, when the forward movement holding mechanism 12 holding the case 35 carries out an upward rotation or a downward rotation, if the upper cover 48 and the lower cover 49 are about to rotate along with the forward movement holding mechanism 12 and the case 35 so that a longer length from the end portion 52b, 53b is required at the connecting part 52a, 53a to the cover during a rotary movement than length dimension L of the connecting member 52, 53 itself from the held end portion 52b, 53b to the connecting part 52a, 53a, by that increment in length, conversely, the connecting members 52, 53, as shown in FIGS. 6A and 6B, reach a state of drawing the upper cover 48 and the lower cover 49, that is, cause an opening movement of the upper cover 48 and the lower cover 49 so as to form the openings 45 and 46. More specifically, with the construction as in the first embodiment, a mechanical operation of the interlock mechanism 51 constructed with the connecting members 52, 53, as a result of a turn of the forward movement holding mechanism 12, allows opening the openings 45, 46 for projection of the airbag 30 in the case 35 for storing one airbag 30 at an upper side or a lower side by an opening movement of the upper cover 48 and the lower cover 49 due to drawing of the predetermined connecting members 52, 53, and by the subsequent inflow of an inflating gas, the airbag 30 projects from the predetermined openings 45, 46 of the case 35, and the front upper side FU or the front lower side FD of the vehicle V can be covered. Therefore, in the first embodiment, the pedestrian protection system S1 structured to cover the front upper side FU or the front lower side FD of the vehicle V with one airbag 30 stored in the case 35 can be constructed with a further simple structure without separately providing a drive source for opening the openings 45, 46 for projection of the airbag 30 in the case 35.

Figure 12:
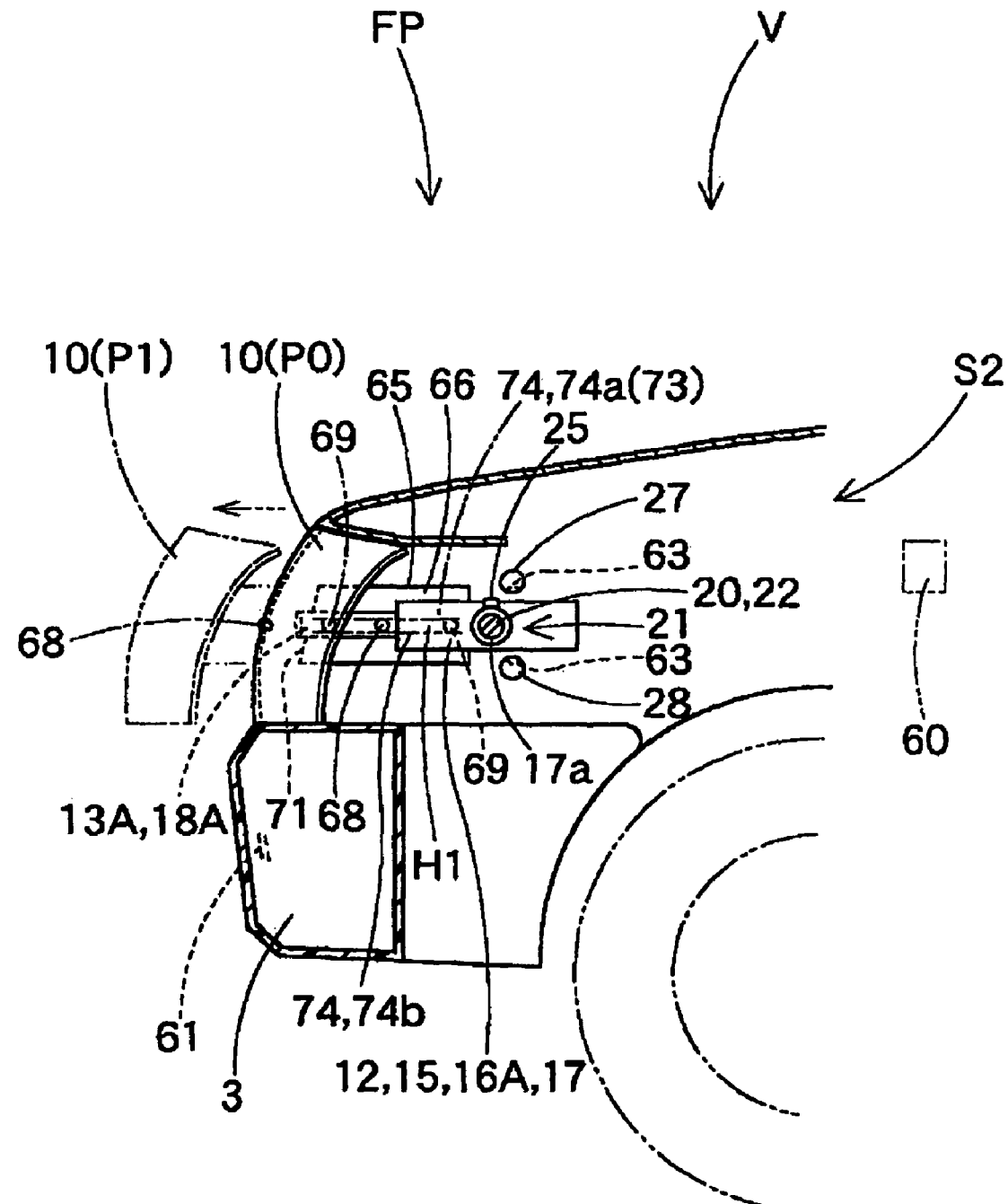
FIG. 12 is a schematic side view showing a pedestrian protection system of the second embodiment.
Figure 13A:
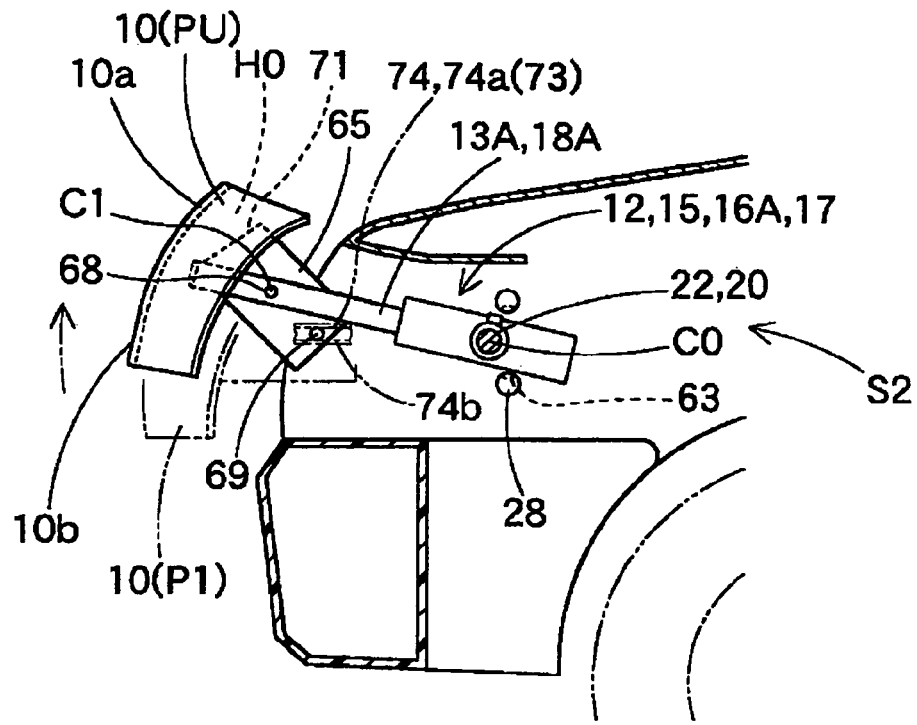
FIGS. 13A and 13B are views explaining a state where the front-end opening of the case is facing upward and a state where the same is facing downward in the pedestrian protection system of the second embodiment.
Figure 13B:
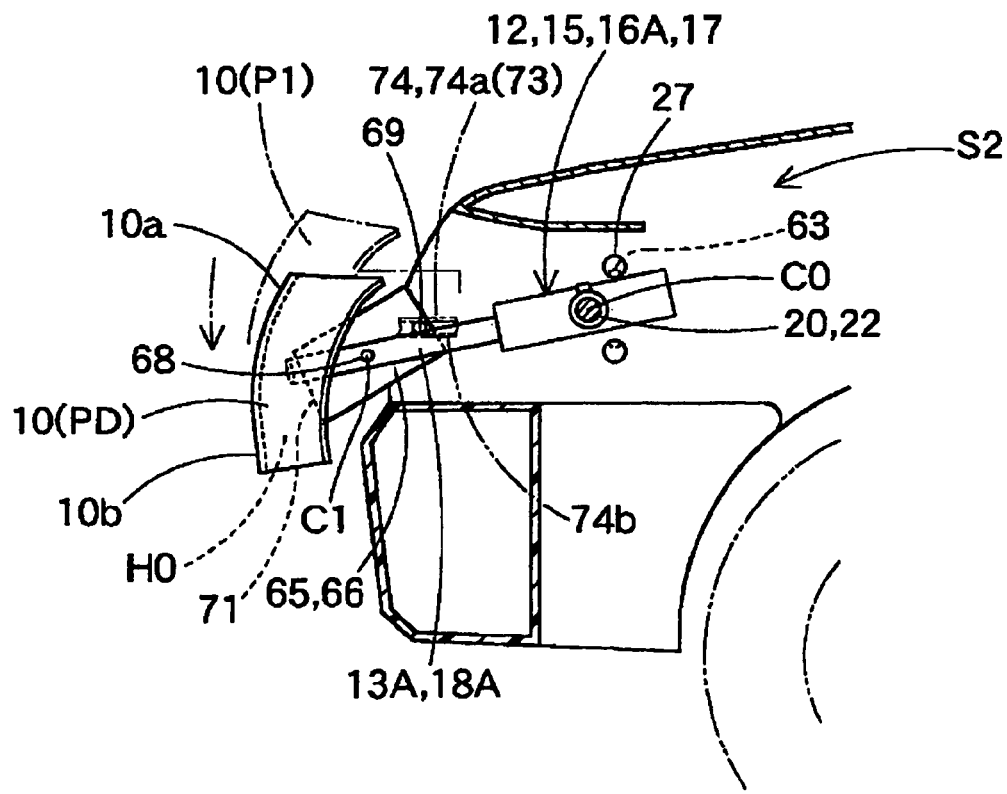
Figure 14A:
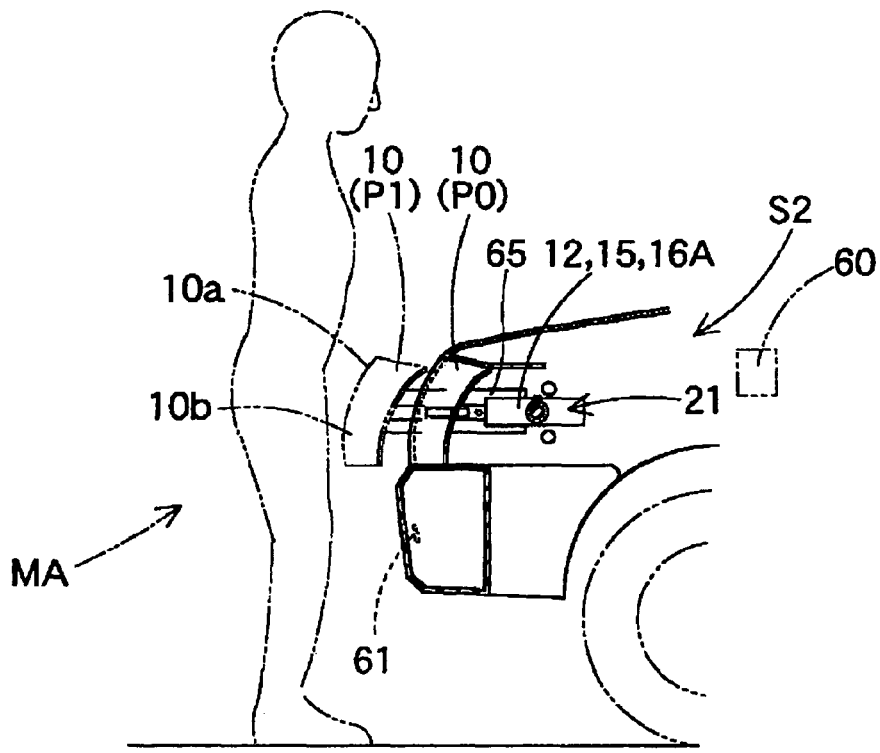
FIGS. 14A and 14B are views explaining an upward rotating state of the contact body and the advancement holding mechanism in the pedestrian protection system of the second embodiment.
Figure 14B:
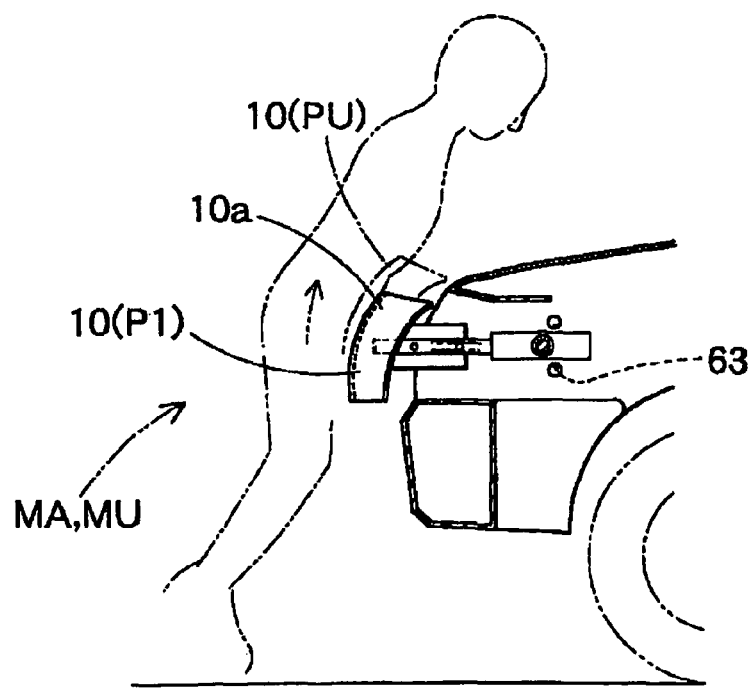

The operations and effects mentioned above can also be obtained in a pedestrian protection system S2 of a second embodiment shown in FIGS. 12, 13A and 13B. In the second embodiment, a case 65 is provided, at a front end arranged at a rear position of the contact body 10 so as to be covered with the contact body 10, with a front-end opening 71 from which the airbag 30 is projectable, and is held by the forward movement holding mechanism 12 so as to be rotatable with the front-end opening 71 facing upward or downward. The case 65, in a rectangular parallelepiped box shape with the front-end opening 71, is connected, at the intermediate parts in the front and rear direction of the left and right side walls 66, with a turning shaft 68 extending from connection supporting members 13A arranged at both left and right sides of the case 65 of the forward movement holding mechanism 12, and is held by the forward movement holding mechanism 12 so as to be rotatable with the front-end opening 71 facing upward or downward. Moreover, disposed at the rear edges of the left and right side walls 66 of the case 65 are support pins 69 projecting to the outside in the left and right direction.

Also, in order to prevent foreign matter etc., from intruding into the case 65, for protection of the folded airbag 30 and an unillustrated inflator, the front-end opening 71 of the case 65 is blocked by a protective cover made easily breakable for the inflating airbag 30.

Moreover, the second embodiment differs from the first embodiment in the point that the connection supporting member 13A of the forward movement holding mechanism 12 includes the turning shaft 68 and an actuator 16A of the drive source 15 is formed with only one actuation rod 18A used also as the connection supporting member 13A, and further, except that the second embodiment also differs in the construction of the case 65 and an interlock mechanism 73, the contact body 10, the deforming portion 20, the turn holding mechanism 21, the airbag 30, the inflator 33, the controller 60, the collision predicting sensor 61, and the turn sensor 63 being other aspects of the construction are constructed to be the same as those in the first embodiment.

The interlock mechanism 73 of the second embodiment is constructed with a guide rail 74 serving as a supporting member. The guide rail 74, which is connected and fixed to the body 1, is composed of an upper rail portion 74a and a lower rail portion 74b that support, in a vertically sandwiching manner, the support pins 69 to be in a further rear-side part than a center of rotation C1 with respect to the forward movement holding mechanism 12 at the rear portion of the case 65 on both left and right sides of the case 65. Also, the turning shaft 68 is formed with a diameter that allows insertion through a gap H1 between the upper rail portion 74a and the lower rail portion 74b of the guide rail 74, and in order not to hinder a forward and rearward movement of the turning shaft 68, the upper rail portion 74a and the lower rail portion 74b are, in the vicinity of the connection supporting member 13, disposed so as to intrude onto the support pin 69 side from above and below.

And, the guide rail 74 serving as a supporting member is disposed, in order to form a gap H0 where the airbag 30 is projectable between the contact body 10 and the front-end opening 71, so as to be able to relatively rotate the case 65 with respect to the forward movement holding mechanism 12 at the time of rotation, and in order to positionally restrict the support pin 69 in the rear side-part of the case 65, so as to be able to move the case 65 and the turning shaft 68 forward and rearward and so as to be unable to move the support pin 69 of the case 65 upward and downward.

In the second embodiment as well, when the vehicle V is about to collide with a pedestrian, because the controller 60 predicts a collision of the vehicle V with the pedestrian based on a signal from the collision predicting sensor 61, the controller 60, first, as shown by alternate long and two short dashed lines in FIG. 12 and in FIGS. 14A and 14B and FIGS. 16A and 16B, actuates each actuator 16A of the forward movement holding mechanism 12 to cause a forward movement of the contact body 10 from the initial position P0 to the forward position P1 where the contact body 10 can contact the pedestrian. Then, the pedestrian hits against the contact body 10, and in response to the magnitude of pressing force toward the upper portion 10a or toward the lower portion 10b of the contact body 10, as shown in FIGS. 13A and 13B, the forward movement holding mechanism 12 rotates to one side of upward or downward.

At this time, in the pedestrian protection system S2 of the second embodiment, as shown in FIGS. 13A and 13B, when the forward movement holding mechanism 12 holding the case 65 carries out an upward rotation or a downward rotation, because the center of rotation C1 of the case 65 with respect to the forward movement holding mechanism 12 is rotated along with the forward movement holding mechanism 12 while the case 65 is positionally restricted in the support pin 69 of the rear-side part of the case 65 by the guide rail 74 serving as a supporting member, the case 65 itself, so as to form a gap H1 where the airbag 30 is projectable between the contact body 10 and the front-end opening 71, relatively rotates the case 65 with respect to the forward movement holding mechanism 12 at the time of rotation to face the front-end opening 71 further upward or downward. That is, in the pedestrian protection system S2 of the second embodiment as well, a mechanical operation of the interlock mechanism 73 constructed with the guide rail 74, as a result of a turn of the forward movement holding mechanism 12, allows opening the front-end opening 71 of the case 65 for storing one airbag 30 facing upward or downward, by a relative rotation of the case 65 due to positional restriction of the guide rail 74 serving as a supporting member, with the gap H0 provided between the same and the contact body 10.

Figure 15:
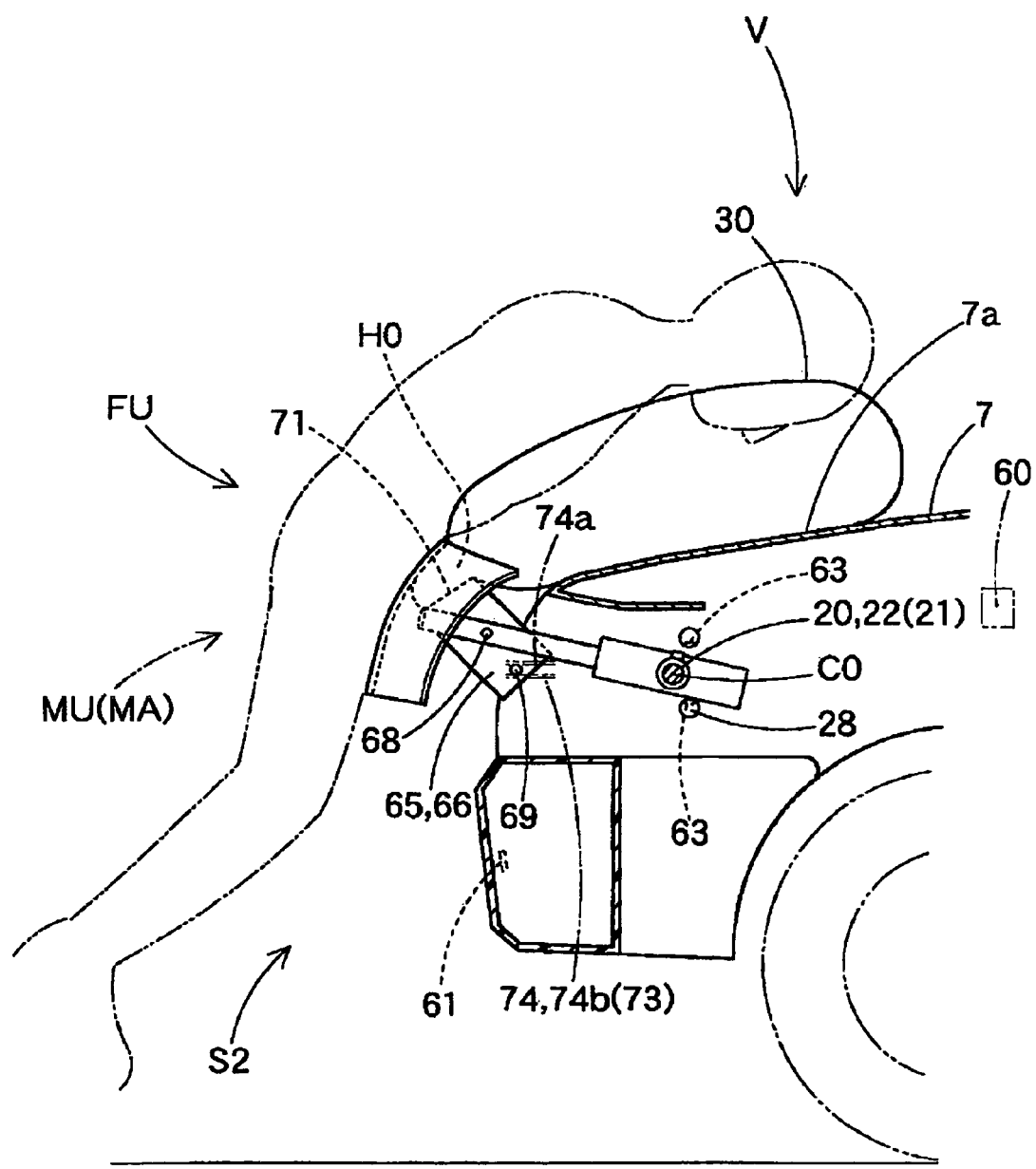
FIG. 15 is a view explaining a state where the airbag receives a pedestrian moving to a front upper side of the vehicle in the pedestrian protection system of the second embodiment.
Figure 16A:
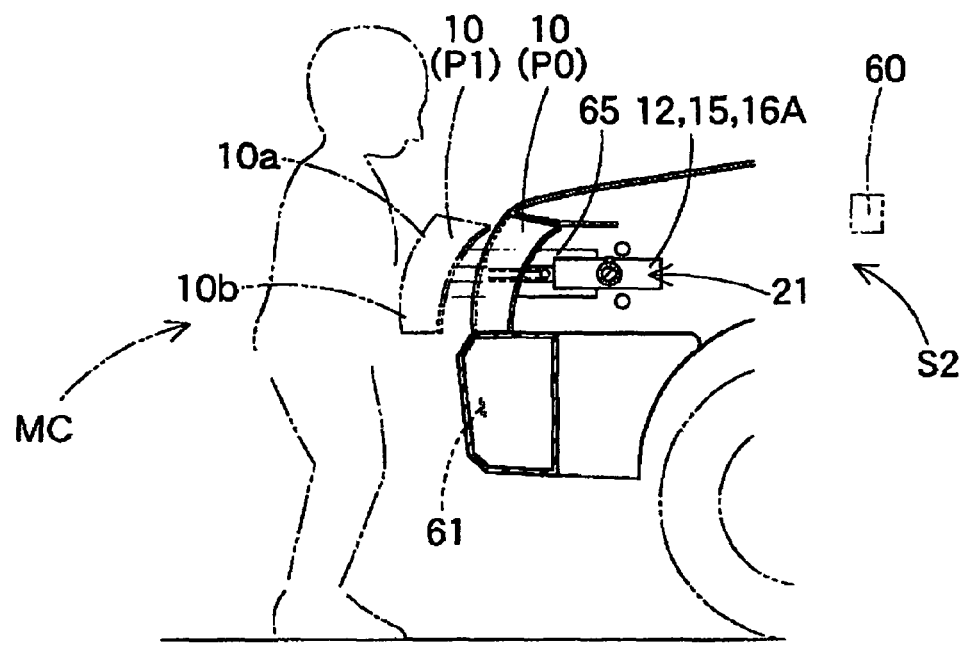
FIGS. 16A and 16B are views explaining a downward rotating state of the contact body and the advancement holding mechanism in the pedestrian protection system of the second embodiment.
Figure 16B:
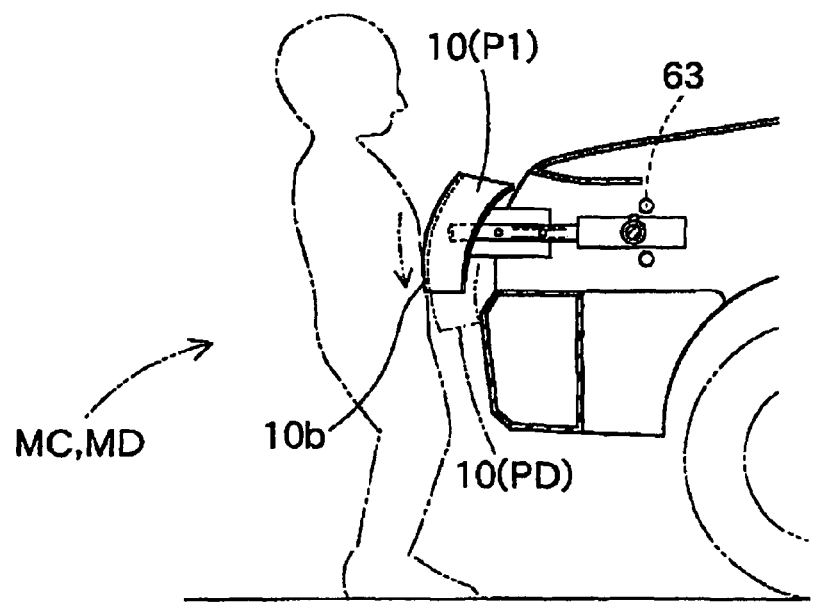
Figure 17:
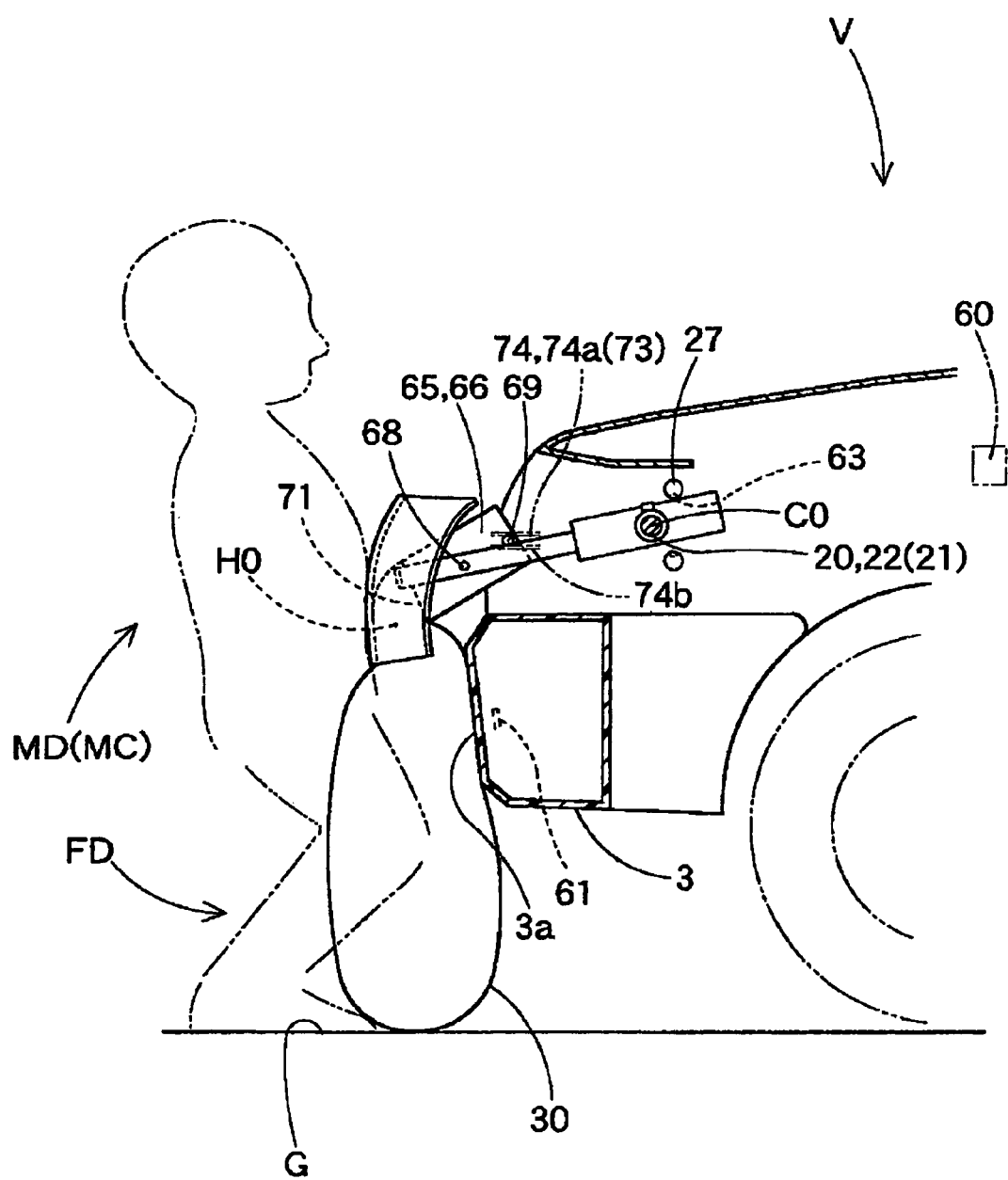
FIG. 17 is a view explaining a state where the airbag receives a pedestrian moving to a front lower side of the vehicle in the pedestrian protection system of the second embodiment.

Then, if the forward movement holding mechanism 12 carries out an upward rotation or a downward rotation, the controller 60, based on a signal from the turn sensor 63, actuates the inflator 33 so as to inflate the airbag 30, and the airbag 30 is inflated. In that case, if the gap H0 with the contact body 10 is at an upper side in the direction in which the front-end opening 71 is facing, as shown in FIG. 15, the airbag 30 projects upward from the front-end opening 71 facing upward, and inflates at the upper face of the front portion 7a of the hood panel 7 to protectably receive a pedestrian MU moving to a front upper side FU of the vehicle V. Also, if the gap H0 with the contact body 10 is at a lower side in the direction in which the front-end opening 71 is facing, as shown in FIG. 17, the airbag 30 projects downward from the front-end opening 71 facing downward, and inflates from the vicinity of the front face 3a of the bumper 3 to a road surface G to protectably receive a pedestrian MD moving to a front lower side FD of the vehicle V.

Accordingly, in the pedestrian protection system S2 of the second embodiment as well, the same operations and effects as those in the first embodiment can be obtained, and the pedestrian protection system S2 structured to cover the front upper side FU or the front lower side FD of the vehicle V with one air bag 30 stored in the case 65 can be constructed with a simple structure without separately providing a drive source for opening the opening (front-end opening) 71 for projection of the airbag 30 in the case 65.

Of course, in the pedestrian protection system S2 of the second embodiment as well, the controller 60, if it is not input with a signal from the turn sensor 63 even after a certain time period has elapsed since it actuated the actuator 16A of the forward movement holding mechanism 12 to cause a forward movement of the contact body 10, actuates the actuator 16A of the forward movement holding mechanism 12 so as to make the contact body 10 return to the initial position P0, judging that a collision of the pedestrian with the vehicle has been avoided.

Moreover, for a pedestrian protection system, two types of an upper restraint body to be disposed at the front upper side of a vehicle and a lower restraint body to be disposed at the front lower side of a vehicle may be disposed as the restraint body such as an airbag. The pedestrian protection system S3 of the third embodiment shown in FIGS. 18A, 18B, 19A and 19B is constructed with an upper airbag 77 serving as an upper restraint body and a lower airbag 81 serving as a lower restraint body which inflate at the front upper side FU of the vehicle V and the front lower side FD of the vehicle V, respectively, at the time of actuation. In the case of the third embodiment, the upper airbag 77 is stored in a case 78 disposed at the front portion 7a of the hood panel 7 in the front upper side FU of the vehicle V, and by actuation of an inflator 79 serving as a gas supply mechanism, as shown in FIG. 19A, makes an inflating gas flow in to inflate, pushes a cover 80 open to project upward, and covers an upper face of the front portion 7a of the hood panel 7 in the front upper side FU of the vehicle V. In addition, the lower airbag 81 is stored in a case 82 disposed at a lower portion of the bumper 3 in the front lower side FD of the vehicle V, and by actuation of an inflator 83 serving as a gas supply mechanism, as shown in FIG. 19B, makes an inflating gas flow in to inflate, pushes a cover 84 open to project downward, and inflates from the vicinity of the front face 3a of the bumper 3 to a road surface G.

Also, for the contact body 10, the forward movement holding mechanism 12, the deforming portion 20, the turn holding mechanism 21, the controller 60, the collision predicting sensor 61, and the turn sensor 63 of the third embodiment, the same components as those of the first embodiment are used.

Figure 18A:
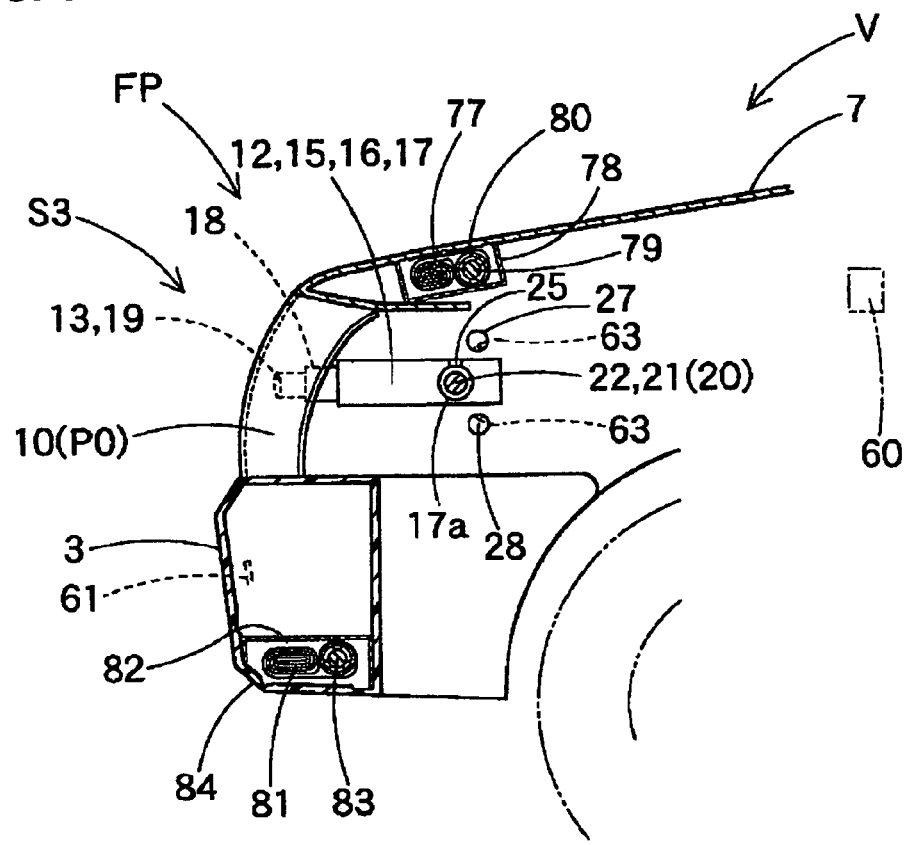
FIGS. 18A and 18B are side views showing a pedestrian protection system of the third embodiment, showing a state where the contact body has moved to an initial position and a forward position.
Figure 18B:
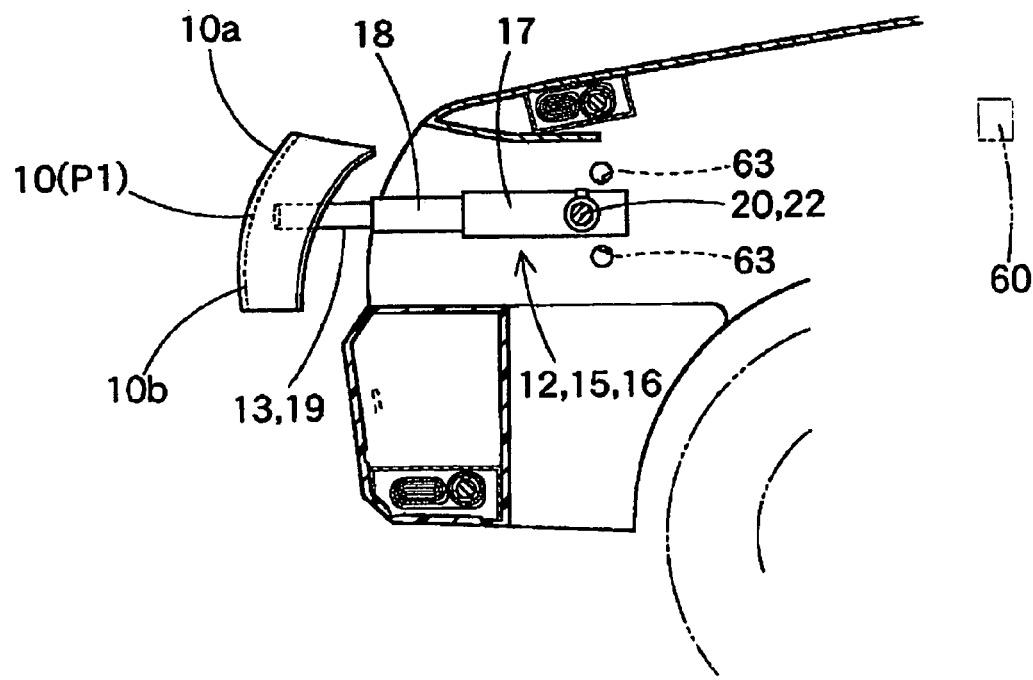
Figure 19A:
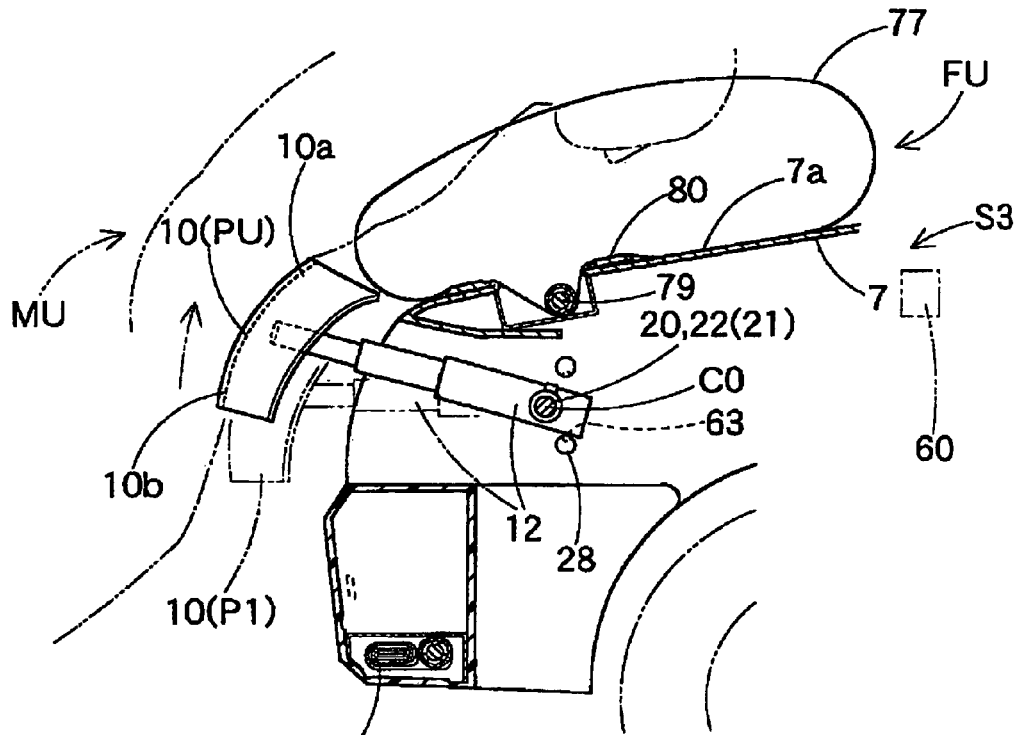
FIGS. 19A and 19B are views explaining states of receiving a pedestrian moving to a front upper side and a front lower side of the vehicle, respectively, in the pedestrian protection system of the third embodiment.
Figure 19B:
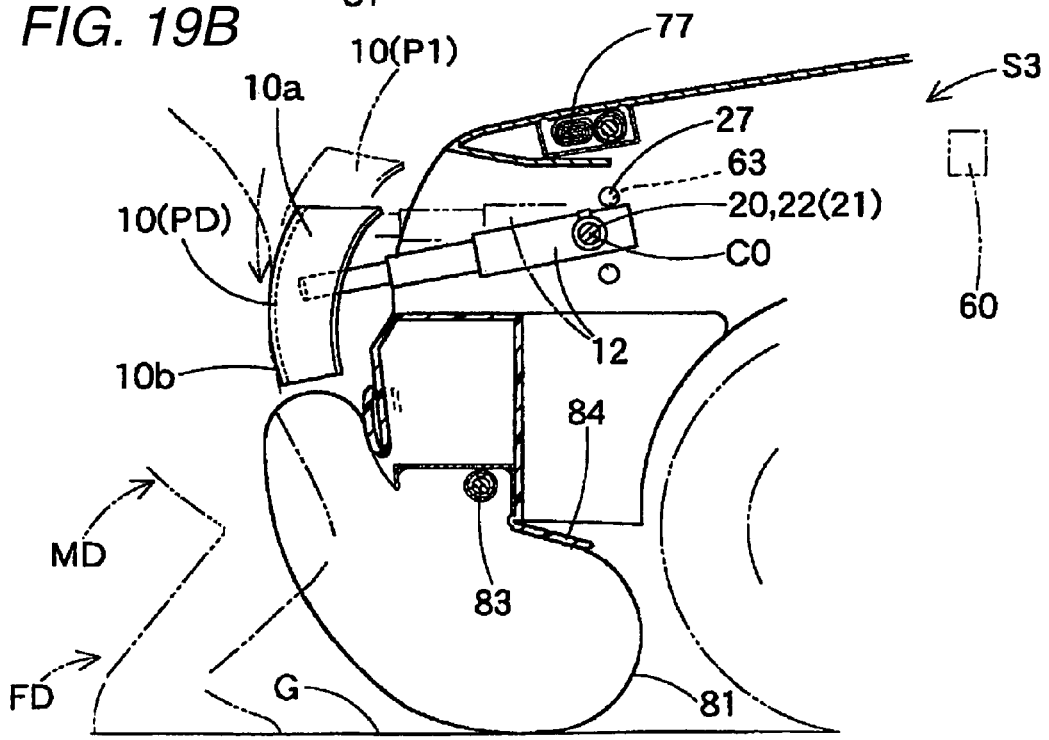

Moreover, at the time of actuation of the pedestrian protection system S3 of the third embodiment, when the vehicle V is about to collide with a pedestrian, because the controller 60 predicts a collision of the vehicle V with the pedestrian based on a signal from the collision predicting sensor 61, the controller 60, first, as shown in FIGS. 18A and 18B, actuates each actuator 16 of the forward movement holding mechanism 12 to cause a forward movement of the contact body 10 from the initial position P0 to the forward position P1 where the contact body 10 can contact the pedestrian. Then, the pedestrian hits against the contact body 10, and in response to the magnitude of pressing force toward the upper portion 10a or toward the lower portion 10b of the contact body 10, as shown in FIGS. 19A and 19B, the forward movement holding mechanism 12 rotates to one side of upward or downward. Then, the controller 60, based on a signal from the turn sensor 63, actuates the inflator 79, 83 for supplying the upper airbag 77 or the lower airbag 81 with an inflating gas. More specifically, in the pedestrian protection system S3 of the third embodiment, when the forward movement holding mechanism 12 carries out an upward rotation, the lower airbag 81 is not inflated but the upper airbag 77 is inflated so as to project from the case 78, and the upper airbag 77 protectably receives the pedestrian MU moving to the front upper side FU of the vehicle V. In addition, when the forward movement holding mechanism 12 carries out a downward rotation, the upper airbag 77 is not inflated but the lower airbag 81 is inflated so as to project from the case 82, and the lower airbag 81 inflates from the vicinity of the front face 3a of the bumper 3 to the road surface G to protectably receive the pedestrian MD moving to the front lower side FD of the vehicle V.

In the third embodiment as well, because the airbags (upper/lower) 77, 81 serving as restraint bodies are actuated so as to be able to selectively protect a pedestrian MU moving to the front upper side FU of the vehicle V or a pedestrian MD moving to the front lower side FD of the vehicle V, the restraint bodies can be formed small, so that it becomes possible to construct the pedestrian protection system S3 with remarkably lightweight and small size.

Figure 20A:
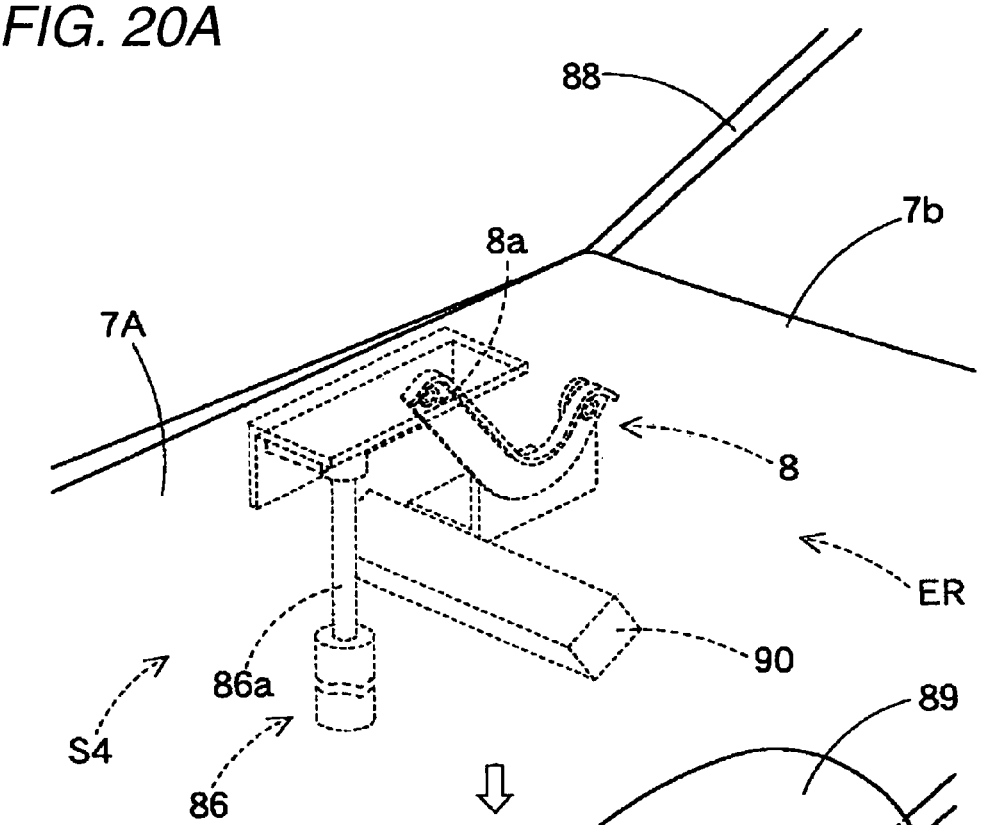
FIGS. 20A and 20B are views explaining the restraint body that receives a pedestrian moving to a front upper side of the vehicle in a pedestrian protection system of the fourth embodiment.
Figure 20B:
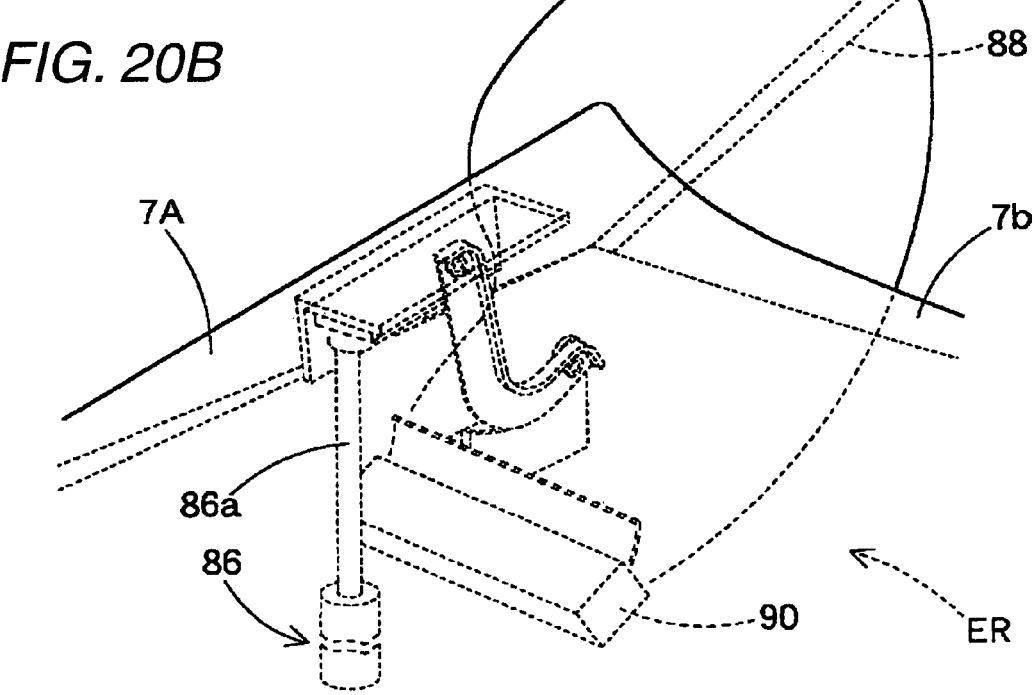
Figure 21:
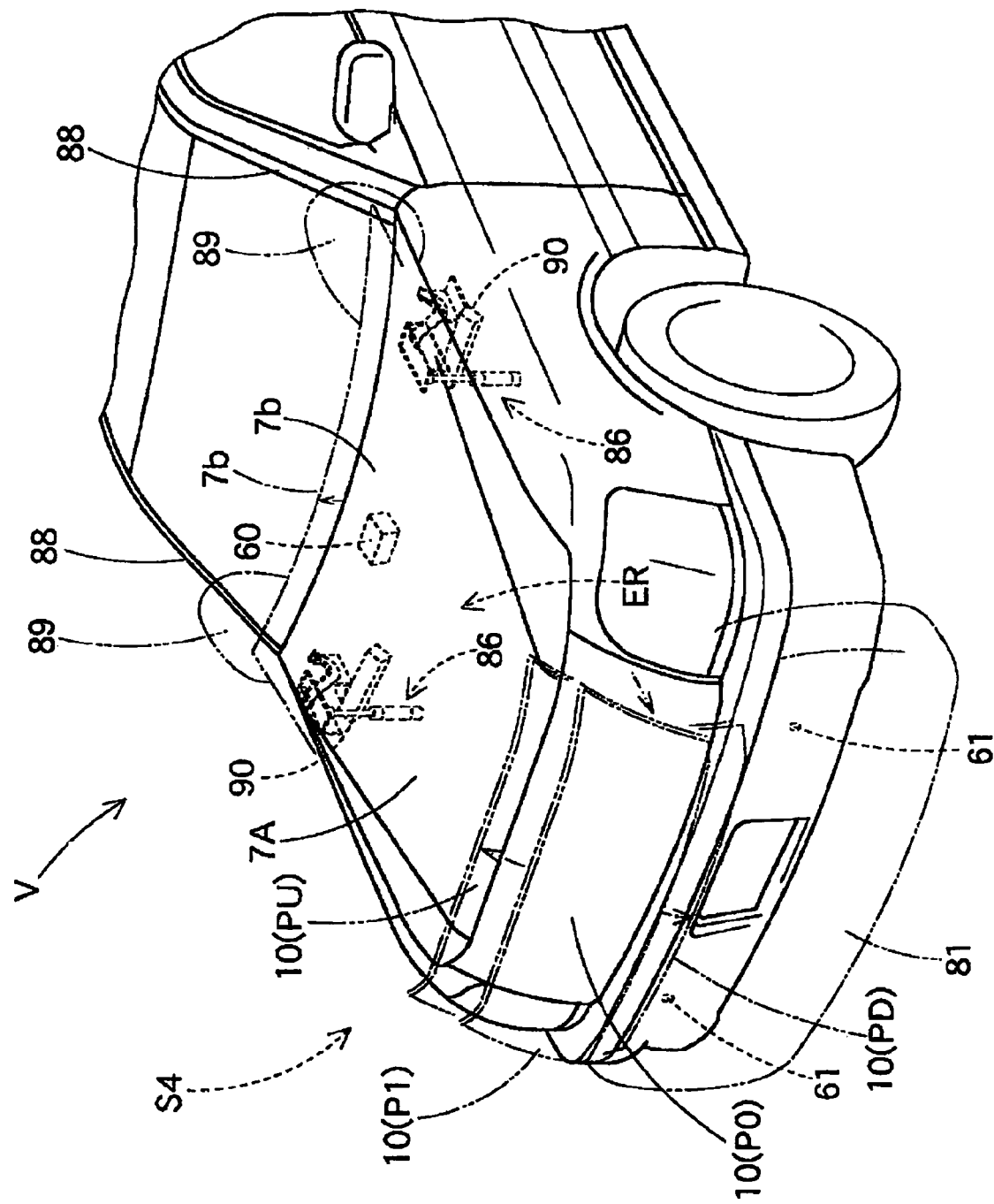
FIG. 21 is a perspective view of a vehicle mounted with the pedestrian protection system of the fourth embodiment of the present invention.

Also, the restraint body for receiving a pedestrian moving to the front upper side or front lower side of a vehicle is not limited to an airbag that makes an inflating gas flow in and projects from a storing part to inflate, as long as it can protectably receive a pedestrian. For example, as in a pedestrian protection system S4 of a fourth embodiment shown in FIGS. 20A, 20B and 21, a plastically deformable hood panel 7A may be used as the restraint body that receives a pedestrian MU moving to the front upper side FU of the vehicle V. In the pedestrian protection system S4 of the fourth embodiment, a piston cylinder-type actuator 86 for raising a rear end 7b of the hood panel 7A is arranged below the vicinity of both left and right edges of the rear end 7b of the hood panel 7A. Unlike the actuator for moving forward and rearward the contact body 10 that is made to return at the time of avoidance of a collision, the actuator 86 is actuated after a pedestrian contacted the contact body 10, and does not take a return into consideration, and thus may use, as a drive source, a micro-gas generator that generates a working fluid by ignition. In addition, at the time of actuation of the actuator 86, a piston rod 86a rises to break a shear pin 8a of a hinge mechanism 8 at the rear end of the hood panel 7A having a front opening structure, deform a part of the hinge mechanism 8, and raise the rear end 7b of the hood panel 7A.

Moreover, as the restraint body for a pedestrian moving to the front upper side FU of the vehicle V of the fourth embodiment, the lower airbag 81 of the third embodiment is disposed.

And, in the pedestrian protection system S4, based on a signal from a turn sensor (not shown) resulting from an upward rotation of an unillustrated forward movement holding mechanism, the controller 60 actuates the actuator 86 to raise the rear end 7b of the hood panel 7A. At this time, the hood panel 7A can be arranged, above an engine room ER, with an increased deformation space that allows deforming downward, so that the pedestrian plastically deforms the hood panel 7A to be received by the hood panel 7A while kinetic energy is absorbed.

Also, in the pedestrian protection system S4 of the fourth embodiment, the controller 60, based on a signal from a turn sensor (not shown) resulting from an upward rotation of an unillustrated forward movement holding mechanism, inflates an airbag 89 that can cover the front face of a front pillar 88 so as to protrude from a case 90 where this is stored, and the airbag 89 may be used as a restraint body for a pedestrian moving to the front upper side FU of the vehicle V.

What is claimed is:

1. A pedestrian protection system mounted in a front portion of a vehicle and structured to allow disposing a restraint body that is actuated at the time of collision of a pedestrian with the vehicle for protectably receiving in a manner corresponding to the pedestrian moving to a front upper side of the vehicle and the pedestrian moving to a front lower side of the vehicle, respectively, so as to be in a receiving state, comprising:

a contact body that is projected forward from an initial position where the contact body is stored in a front face of the vehicle, for contacting the pedestrian, at the time of actuation;

a forward movement holding mechanism that makes the contact body projectable forward at the time of actuation, for holding the contact body from a rear side thereof;

a turn holding mechanism for holding a rear portion of the forward movement holding mechanism so as to rotate the forward movement holding mechanism to one side of upward or downward, at the time of contact of the forwardly moved contact body with the pedestrian, in response to a magnitude of pressing force toward an upper portion or toward a lower portion of the contact body;

a collision predicting sensor disposed on the vehicle, for predicting the collision of the pedestrian with the vehicle;

a turn sensor for detecting an upward or downward turn of the forward movement holding mechanism; and a controller for controlling actuation of the forward movement holding mechanism and the restraint body based on signals from the collision predicting sensor and the turn sensor, wherein when having predicted the collision of the pedestrian with the vehicle based on a signal from the collision predicting sensor, the controller actuates the forward movement holding mechanism to cause a forward movement of the contact body, and based on a signal from the turn sensor when the forward movement holding mechanism carries out an upward rotation or a downward rotation at the time of contact of the forwardly moved contact body with the pedestrian, the controller controls actuation of the restraint body so as to correspond to the pedestrian moving to a front upper side of the vehicle and the pedestrian moving to a front lower side of the vehicle.

2. The pedestrian protection system according to claim 1, wherein the forward movement holding mechanism comprises:

a connection supporting member that extends rearward in a manner connected to a rear face of the contact body; and a drive source that holds the connection supporting member, and is actuated by an actuation signal from the controller to cause a forward movement of the connection supporting member along with the contact body, and the turn holding mechanism comprises:

a holding shaft disposed, at a rear side of the forward movement holding mechanism, with an axial direction thereof lying along a left and right direction, and being rotatable around the axis; and a connection holding member for connecting the drive source of the forward movement holding mechanism to the holding shaft, and wherein a deforming portion that is deformed so as to be able to absorb kinetic energy of the pedestrian when the forward movement holding mechanism turns upward and downward at the time of contact of the forwardly moved contact body with the pedestrian is disposed at, at least a part of the forward movement holding mechanism and the turn holding mechanism.

3. The pedestrian protection system according to claim 1, wherein
the controller actuates the forward movement holding mechanism so as to return the contact body to an initial position after actuating the forward movement holding mechanism to cause a forward movement of the contact body, when the collision of the pedestrian with the vehicle is avoided.

4. The pedestrian protection system according to claim 1, wherein the restraint body for receiving the pedestrian moving to a front lower side of the vehicle is an airbag that makes an inflating gas flow in and projects from a storing part to inflate at the time of actuation to be in a receiving state.

5. The pedestrian protection system according to claim 1, wherein the restraint body for receiving the pedestrian moving to a front upper side of the vehicle is an airbag that makes an inflating gas flow in and projects from a storing part to inflate at the time of actuation to be in a receiving state.

6. The pedestrian protection system according to claim 1, wherein the restraint body for receiving the pedestrian moving to a front upper side of the vehicle is, as a hood panel, moved to rise at the time of actuation to be in a receiving state.

7. The pedestrian protection system according to claim 1, wherein the restraint body is formed of one airbag that makes an inflating gas flow in to inflate at the time of actuation to be in a receiving state,
the forward movement holding mechanism is structured so as to hold the airbag and a case storing the airbag while having an opening from which the airbag is projectable, and arranged at a rear face of the contact body,
an interlock mechanism that faces the opening from which the airbag is projected in the case upward or downward in an interlocked manner with an upward rotation or a downward rotation of the forward movement holding mechanism is disposed, and
the one airbag is disposed so as to inflate, according to a direction of the opening of the case by the interlock mechanism, at the time of actuation, in a manner corresponding to the pedestrian moving to a front upper side or a front lower side of the vehicle.

8. The pedestrian protection system according to claim 7, wherein
the case is disposed, at an upper face and a lower face, with openings from which the airbag is projectable and covers that openably cover the respective openings, respectively,
the interlock mechanism is constructed with connecting members that are connected, for the covers at the upper face and the lower face of the case, respectably, so that an opening movement is possible, and
the respective connecting members are disposed with end portions departing from connecting parts with the covers being held, in the vicinity of a center of rotation of the forward movement holding mechanism, at mutually vertically inverted positions so that an opening movement of the corresponding cover is possible when the forward movement holding mechanism carries out an upward rotation or a downward rotation.

9. The pedestrian protection system according to claim 7, wherein
the case includes, at a front end side arranged at a rear position of the contact body, a front-end opening from which the airbag is projectable, and is held by the forward movement holding mechanism so as to be rotatable with the front-end opening facing upward or downward,
the interlock mechanism is constructed with a supporting member for supporting a further rear-side part than a center of rotation with respect to the forward movement holding mechanism in the case, and
the supporting member is disposed, in order to form a gap where the airbag is projectable between the contact body and the front-end opening, so as to be able to relatively rotate the case with respect to the forward movement holding mechanism at the time of rotation, in order to positionally restrict a rear-side part of the case, so as to be able to move the case forward and rearward and so as to be unable to move the rear-side part of the case upward and downward.

* * * * *